(12) United States Patent
Noble

(10) Patent No.: US 6,729,882 B2
(45) Date of Patent: May 4, 2004

(54) PHONETIC INSTRUCTIONAL DATABASE COMPUTER DEVICE FOR TEACHING THE SOUND PATTERNS OF ENGLISH

(76) Inventor: Thomas F. Noble, 2990 Diana Ct., Newbury Park, CA (US) 91320

( * ) Notice: Subject to any disclaimer, the term of this patent is extended or adjusted under 35 U.S.C. 154(b) by 0 days.

(21) Appl. No.: 09/924,377

(22) Filed: Aug. 9, 2001

(65) Prior Publication Data

US 2003/0118973 A1 Jun. 26, 2003

(51) Int. Cl.[7] .......................... G09B 17/00; G09B 19/04
(52) U.S. Cl. .................... 434/167; 434/178; 434/185
(58) Field of Search ................................ 434/156, 157, 434/167, 178, 185

(56) References Cited

U.S. PATENT DOCUMENTS

| 4,912,671 | A | * | 3/1990 | Ishida | 434/157 |
|---|---|---|---|---|---|
| 5,421,731 | A | | 6/1995 | Walker | |
| 5,799,267 | A | * | 8/1998 | Siegel | 434/156 |
| 5,953,692 | A | * | 9/1999 | Siegel | 434/167 |
| 6,009,397 | A | * | 12/1999 | Siegel | 434/156 |
| 6,116,907 | A | * | 9/2000 | Baker et al. | 434/156 |
| 6,148,286 | A | * | 11/2000 | Siegel | 434/169 |
| 6,227,863 | B1 | | 5/2001 | Spector | |
| 6,442,523 | B1 | * | 8/2002 | Siegel | 434/169 |

* cited by examiner

Primary Examiner—John Edmund Rovnak

(57) ABSTRACT

This invention, designed primarily for teachers, is a computer based self-teaching instructional device covering the sound patterns of American English and covering sounds in words all the way from cat to tetrahydrocannabinal. Teachers can create their own lesson plans and enhance their student's work learning experiences by the us e of both aural inputs and visual displays.

11 Claims, 15 Drawing Sheets

System and Peripheral* Components

Fig. 3

Basic Development Concepts

1. Stages of Phonetic Development

|   | Phase | Grade Level |
|---|---|---|
| 1. B | Beginning | $1^{st}$ to $3^{rd}$ |
| 2. E | Elementary | $3^{rd}$ to $9^{th}$ |
| 3. F | Final | H.S. & U. |

2. Syllable Structure

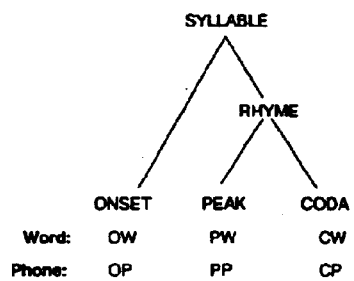

|  | Onset | Peak | Coda |
|---|---|---|---|
| Word: | OW | PW | CW |
| Phone: | OP | PP | CP |

3. Major Vowel Sound Factors

1. Single/Digraph     V; VV
2. Syllable form
 - Open     C(C)V
 - Closed
   - Silent e end     -VC(C)e
   - Consonant end     -VC(C)
3. Following letter r     Vr; VVr
4. Syllable Stress

4. Word Structure

1. Polysyllable words
   - Simple — Stress
   - Complex — Prefix/Suffix/Stress
2. Compound words
   - Simple — Part of Speech/Stress
   - Pseudo-compound — Prefix/Stress/Free Root or Monosyllable Ending
3. Technical lexicons

5. Instructional Approach

1. Flexible user inputs
2. Multiple visual outputs
3. Aural capability

Fig. 4

Instructional Approach

Users:

Teachers
        Teachers in training
        Teachers in practice
            Subject areas
                Reading instruction
                    Beginning
                    Remedial
                Spelling
                English as a second language
                Phonetics
                Word structure
                Technical language, all grade levels
    Students
        Active user, $6^{th}$ grade and above
        Passive user, $1^{st}$ to $6^{th}$ grade
    Anyone interested in words

Uses:

Teacher phonetic training
        Beginning
        Refresher
    Teaching tool
        Phonics
        Reading
        Spelling
        Word structure
        Technical language
    Student self-training tool
    Adult self-training tool

Fig. 7

| OP | OW | CountFX | CountEX | CountBX |
|---|---|---|---|---|
| sky | sc | 1 | 0 | 0 |
| sky | sk | 1 | 0 | 0 |
| smy | sm | 1 | 0 | 0 |
| spl | spl | 11 | 5 | 2 |
| spr | spr | 20 | 14 | 6 |
| spy | sp | 3 | 1 | 0 |
| str | str | 43 | 31 | 14 |
| »r | thr | 23 | 18 | 6 |
| »w | thw | 2 | 1 | 0 |
| »y | th | 1 | 0 | 0 |
| ¼l | schl | 3 | 0 | 0 |
| ¼m | schm | 4 | 0 | 0 |
| ¼n | schn | 2 | 0 | 0 |
| ¼r | shr | 18 | 14 | 1 |
| ¼t | scht | 1 | 0 | 0 |
| ¼w | schw | 1 | 1 | 0 |
| bl | bl | 59 | 38 | 11 |
| br | br | 88 | 55 | 21 |
| by | b | 2 | 1 | 0 |
| dr | dr | 55 | 37 | 17 |
| dw | dw | 3 | 2 | 1 |
| fl | fl | 73 | 52 | 17 |
| fl | phl | 2 | 1 | 0 |
| fr | fr | 45 | 29 | 13 |
| fr | phr | 1 | 1 | 0 |

Status: Search Complete

Onsets/Peaks/Codas
1. One Syl. Word Onset

Select Category
- Onsets And Codas
- One Syl. Peaks

Stressed Syl. Peaks
- Two Syl. Peaks: Stressed 1st Syl.
- Two Syl. Peaks: Stressed 2nd Syl.

Unstressed Syl. Peaks
- Non-Prefixed Words
- Prefixed Words

Rhymes
Vowel   Count>
Enter Rhyme

Recordsets: 131

Return

Fig. 8

| PW | PP | CountF | CountE | CountB |
|---|---|---|---|---|
| a | a | 408 | 296 | 124 |
| a | Á | 1 | 1 | 0 |
| a | ä | 44 | 26 | 9 |
| a | â | 34 | 26 | 16 |
| a | u | 2 | 2 | 2 |
| e | Á | 2 | 0 | 0 |
| e | e | 287 | 188 | 92 |
| i | Ê | 2 | 1 | 0 |
| i | i | 448 | 303 | 132 |
| i | ī | 37 | 30 | 19 |
| o | ' | 1 | 1 | 1 |
| o | ' | 3 | 3 | 1 |
| o | ä | 200 | 115 | 42 |
| o | â | 50 | 36 | 20 |
| o | ō | 45 | 35 | 15 |
| o | u | 10 | 7 | 5 |
| u | ' | 10 | 7 | 6 |
| u | ' | 3 | 1 | 1 |
| u | u | 321 | 230 | 90 |
| y | i | 15 | 7 | 1 |
| y | i | 1 | 0 | 0 |

Status: Search Complete

Onsets/Peaks/Codas
7.One Syl.Word:Closed Syl.:Or.Peak

Select Category
- Onsets And Codes
- ⦿ One Syl. Peaks

Stressed Syl. Peaks
- Two Syl. Peaks: Stressed 1st Syl.
- Two Syl. Peaks: Stressed 2nd Syl.

Unstressed Syl. Peaks
- Non-Prefixed Words
- Prefixed Words

Rhymes
Vowel    Count >

Enter Rhyme

Recordsets: 21

Return

Fig. 11

PHONETIC INSTRUCTIONAL DATABASE COMPUTER DEVICE FOR TEACHING THE SOUND PATTERNS OF ENGLISH

BACKGROUND OF THE INVENTION

The invention described herein is a personal computer based instructional program on the sound patterns of American English. Teachers are the anticipated primary users. Teachers can use the program in a self-teaching fashion to discover a variety of facts about word sounds and structure perhaps not already known or to refresh those facts on the subject that were once well known. After teachers become acquainted with the program operation and information, they can use it as an instructional tool for their students. Hereafter, the invention is alternately referred to as the LearnWords Device.

Formal education in the sound patterns of American English starts in the first grade when a student is introduced to written letters and proceeds throughout all academic levels. The various phases of acquiring sound pattern knowledge are summarized below:

1. Phonemic awareness—Making a first grade student aware that the sound of a word can be subdivided into smaller units. For example, that the word cat(kat) consists of three sounds: an initial sound, |k|; a middle sound, |a|; and a final sound, |t|.
2. Grapheme awareness—A child must be taught about letters—the alphabet—and that words can be represented by letter combinations.
3. Alphabetic awareness—Informing the child of the relationship between the sounds of a word and the letters of a word. This relationship is known as the alphabetic principle.
4. Phonetic awareness—The student is instructed in various consonant and vowel sounds and learns how to blend sounds to make the sound of a word.
5. Syllabification—After the child is reasonably well acquainted with letter/sound correspondences in one-syllable words, he is made aware that larger words are made up of syllables.
6. Words and syntax—Following introduction to the above underlying word sound principles, the child is shown by simple examples how words go together to form sentences.
7. Morphological awareness—Early on in his reading skill development the child is taught that adding parts to words can change the word's meaning. Teaching the student how to form plurals, possessives, and tenses by using inflectional suffixes starts this phase.
8. Word structure—In the middle grades a student is introduced to the uses of prefixes and suffixes in forming complex words and also made aware of word stress patterns.
9. Technical lexicon—As the student progresses to high school and college level, he is exposed to a broad range of vocabulary associated with various academic fields of study.

As the above phases indicate the study of English sound patterns is a continuous process from the start to the end of one's schooling. Academic instruction on word sounds is done both directly and indirectly.

In the first two or three years of schooling a child is directly instructed in letters, sounds, words, syllables, and reading. From this point on until a student reaches the last two years of high school almost all instruction on English sound patterns is done indirectly. The student learns the sounds of new words as the teacher uses them. The student may glean pronunciation information when he is introduced to parts of speech, affixations, and technical vocabulary. The student is also taught how to use the dictionary and phonetic spellings. On occasion, he may have a teacher who gives him supplemental information on the sound patterns of English to help him master some difficult words, particularly for spelling.

In the last two years of high school, if the student is enrolled in an academic or college preparatory curriculum, he may be required to take a course that directly addresses phonology, morphology, and word structure.

At the University level, a student majoring in Linguistics will receive much direct instruction in the sound patterns of English. Students majoring in English, teaching, and some technical fields may be required to take courses in word structure. Reading teachers may also get direct instruction in the use of phonics for teaching reading.

By and large, any direct instruction of sound patterns of English for most students is given in the first and last few years of their formal education. In the middle years instruction is indirect and based on knowledge that the teacher can directly present.

The situation is different for foreign students entering the school system. These students must master a large part of the English sound system in order for indirect instruction to be relevant. These students are given a lot of direct instruction in the English sound system regardless of their grade level to help them catch up with native speakers.

A demand for alternate instructional resources outside the normal educational system has resulted due to the heavy reliance on indirect instruction on the sound patterns of English. The four major areas where alternate instructional resources are available are:

1. Phonics reading programs,
2. Word power development programs,
3. English language programs, and
4. Talking dictionary programs.

People who feel that their school system is not placing enough emphasis on phonics or who feel that their child did not master the subject over the short span of time phonics was presented turn to the commercial market for help. "HOOKED ON PHONICS®" is an example of a widely advertised program for reading through the knowledge of phonics. At most computer stores a parent can buy inexpensive phonics programs supplied on computer discs. Inexpensive programs are also available on cassette tape.

While most of these programs are beneficial, a young child is not intellectually mature enough to apply the concepts presented to a meaningful reading situation. Unless the child's parents are able to help him make this transfer the program benefits as a reading-skills training device will be marginal.

The word power development programs are used by adults who either were unable to master sound patterns and word pronunciation from an indirect instructional approach used in formal schooling or, perhaps, were never given exposure to a technical lexicon for which they now have a need. These programs are presented in text, tape, and computer disc format. These programs can be helpful depending on the diligence of the user.

English language learning programs, for non-English speakers, are available in text, on cassette tape, and on computer disc. They can be very useful for anyone that does not have access to a school. Even in a classroom environment tapes and discs can be used to advantage in accustoming the listener's ear to different voices other than the teacher.

Talking dictionaries on computer discs are a relatively new approach for learning to pronounce words. Their use can be extremely valuable in building word power for an individual. The value of the talking dictionary is substantially increased when it is incorporated with another program that provides selected words or word lists that illustrate fundamental concepts of pronunciation.

The LearnWords Device is not a competitor to the above mentioned conventional self-teaching language programs. In fact the LearnWords Device can supplement and increase the value of the four types of programs discussed above.

The primary purpose of the LearnWords device is to provide teachers a self-teaching program on the sound patterns of English to improve both their direct and indirect instruction on word sounds and pronunciation.

Teachers who have not been exposed to academic work covering the sound pattern of English or teachers who want a quick refresher course on the subject can obtain meaningful self-training with the LearnWords Device. By the use of database techniques the teachers can explore at their pace a myriad of sound patterns covering elementary words to highly technical vocabulary.

After teachers have seen and tried the capabilities of the LearnWords Device, they can use the tools available to provide their students an enhanced word learning experience.

For example, if some students are having a difficult time mastering the pronunciation, spelling, and definition of some technical terms in biology, the teacher can selectively set up a word list in the LearnWords Device and the students can see, hear, and read definitions of the various words by clicking on the words in the list until all are memorized. An enterprising teacher can go further and help the students to understand the structure and sound parts of the words in anticipation that this effort will help the students learn to pronounce similar words in the future.

SUMMARY OF THE INVENTION

Learning to pronounce English is a life long process starting with learning the alphabet and one-syllable words like cat up through polysyllable words like tetrahydrocannabinal. Most computer devices designed to aid individuals in the pursuit of English pronunciation are aimed at the learner rather than the teacher. This language computer device is primarily a tool to assist English language instructors in providing a dynamic learning environment for their students, although the learner, and others, can also use the device.

Using a database formed using a Syllable Concept Method and a Word Structural Stress Method, this computer device provides the user a comprehensive overview of the sound patterns of English, all the way from cat to tetrahydrocannabinal, in a dynamic fashion. Through user selection and inputs, phonetic word patterns are presented both visually through a computer screen and aurally through a computer speaker.

Preprogrammed database queries permit the user to rapidly and comprehensively survey a variety of English sound patterns. The user can, by the click of a computer mouse button, select word groups for student viewing and listening or, alternately, provide computer printer outputs for student home assignments.

Input and output methods for this computer device are sufficiently flexible that the user can perform research on English word sound patterns.

BRIEF DESCRIPTION OF DRAWINGS

The following drawings are provided to illustrate features and concepts of the LearnWords Device and are referenced in the detailed description of the invention that follows.

FIG. 3 presents a Summary of Development Concepts implemented in the LearnWords Device.

FIG. 4 lists a Summary of Primary Users and Uses of the invention.

FIG. 5 covers the Start Form.

FIG. 7 is a screen view of the Count Form after executing User input.

FIG. 8 is a screen view of the Count Form following a User input for a Select Query on vowel sound count in the one-syllable word lexicon.

FIG. 11 is a screen view of the One-Syllable Word analysis form after the User has entered an input.

DESCRIPTION OF INVENTION

Figure 1:
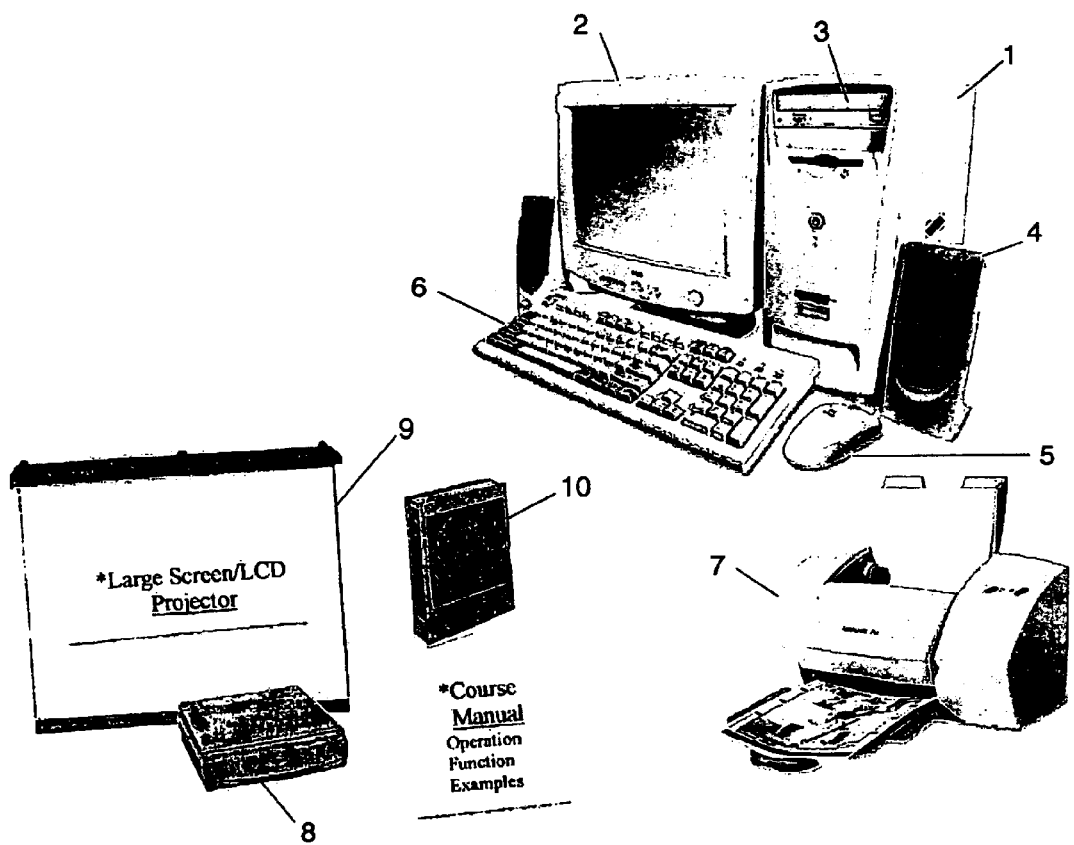
FIG. 1 contains a pictorial representation of System Hardware and Peripheral Components.

A standard desktop computer with the ancillary input and output equipment shown in FIG. 1 can serve as a host for the LearnWords Device. The necessary computer hardware consists of a computer 1, monitor 2, CD-ROM drive 3, speakers 4, mouse 5, keyboard 6, and printer 7. Any computer sold after 1999 should have sufficient computational power to implement all instructional tasks. While the peripheral LCD Projector 8, Large Screen 9, and Training Manual 10, shown in FIG. 1, are not required they are shown with the System Components and will be addressed later in conjunction with teacher training on the LearnWords Device.

Figure 2:
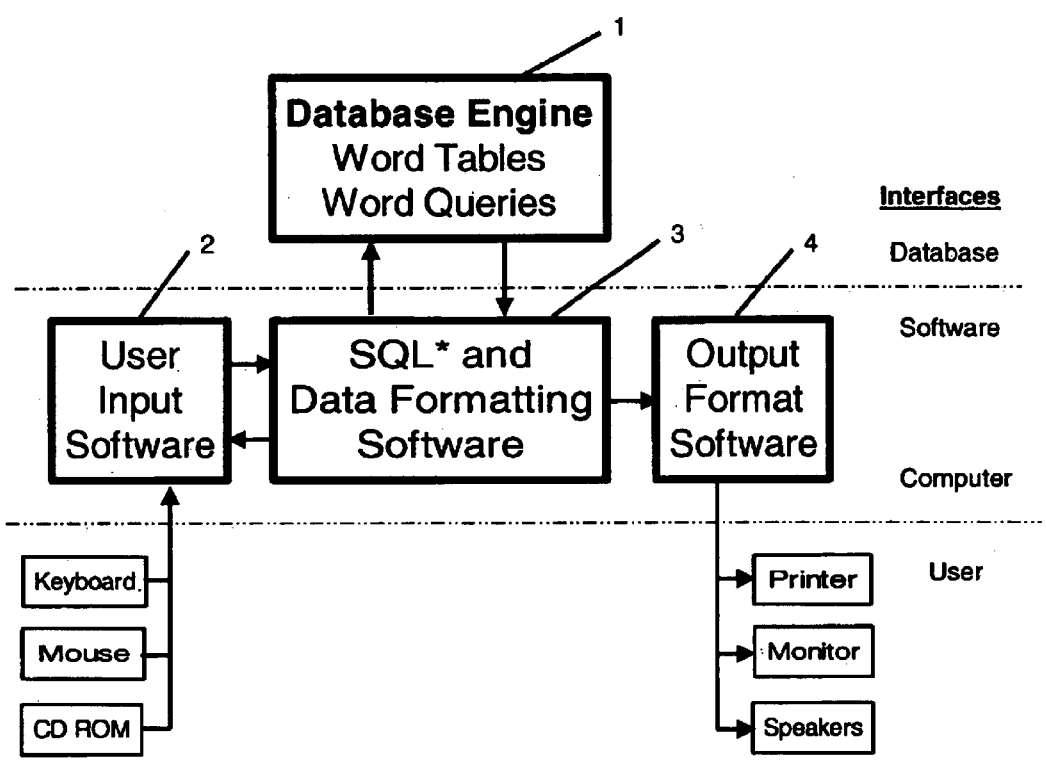
FIG. 2 is a System Interface Block Diagram showing the relationship between hardware and software.

The computational tasks are outlined in the System Interface block diagram in FIG. 2. A Database Engine 1 is required to implement various data searches. While a special purpose Database Engine can be constructed, commercially available Database Engines are quite adequate. A proof-of-concept demonstrator, used to validate concepts for the LearnWords Device, has performed all Database tasks with Access 97© in the Professional Edition of Microsoft® Office97©. Hereafter, the proof-of-concept demonstrator is referred to as the Concept Demonstrator.

Various word tables and stored search queries are resident in the Database. The Database interfaces with a specifically designed software program called LearnWords. This software program performs the three tasks—User Input Software 2, SQL and Data Formatting Software 3, and Output Format Software 4—shown in the block diagram of FIG. 2. The software program, LearnWords, is loaded into the computer's hard drive from a ROM disc through the ROM Drive and remains on the hard drive as a resident program.

When the program LearnWords is operating, the User generates inputs using the computer's mouse and keyboard. These inputs are processed by the User Input Software and are transferred to the SQL(Structured Query Language) Software. The SQL Software processes the inputs and then requests the Database Engine to run selected stored queries or, alternately, sends the Database Engine SQL statements for new queries based on User inputs.

The outputs of the Database Engine are sent back to the Data Formatting Software, which in turn transfers the information to the Output Format Software. As indicated in FIG. 2, the Output Format Software interfaces with the Computer's Printer, Monitor, and Speakers. Any one or all of the output devices may be used during an operating session depending on User inputs.

A computer programmer of ordinary skill and a working knowledge of Microsoft® Visual Basic© and Microsoft Access© can write the necessary software code for the LearnWords program.

As will be discussed later, the operation described above is a dynamic one. When the LearnWords Device is in operation the User views choices on the monitor screen, makes selections, provides inputs, receives information through the monitor, provides additional inputs, and continues in this fashion until satisfied with the results. Outputs can then be stored in a computer file or in hardcopy via the printer or in the User's mind, hopefully, since the invention is an instructional device.

The basic development concepts implemented in the LearnWords software to provide the User with information on the sound patterns of English are shown in FIG. 3. While the concepts will be discussed one at a time it is their joint function which synergistically results in the uniqueness of the LearnWords Device.

Phonetic Development

It is said that the English language includes more than 500,000 words. It is no wonder then that one can spend a lifetime learning new words. One normally builds oral vocabulary one word at a time. Eventually, each of us has a group of words we know and can pronounce. At any stage in our vocabulary development we can stop and identify a group of words that we know. This word group can be called our current lexicon. Several years later we should expect an increase in our lexicon. To measure progress it is useful to have some reference lexicon for comparison. When teachers are helping students learn a language the teacher also can use a reference to put their students' learning in perspective.

Lexicographers have given individuals and teachers a reference lexicon, in a sense, in the form of a dictionary, particularly during ones academic years. Usually, by the time one reaches the second or third grade the student is exposed to her "first dictionary". The dictionary's introduction will say something to the effect, "The nearly 3000 entries in this dictionary were carefully selected from books which the readers encounter in their reading at home and in school".

Several years later one is given an "elementary dictionary" which also contains introductory words to the effect that ". . . the more than 30,000 words and phrases in this dictionary are based on text books and other outside reading material that a student in the elementary grades may encounter".

Finally, the day arrives when one is exposed to the 100,000-word entry "college dictionary".

The lexicons in these three types of dictionaries can provide a reference which teachers can use to assess the phonetic skills of their students at three stages of academic development.

The concept of phonetic development, listed as Item 1 in FIG. 3, is implemented in the LearnWords Device in the following manner. Three separate databases for both one and two syllable words are stored in the LearnWords Database. The word databases are generated by taking all one and two syllable words out of reference dictionaries that correspond to "first", "elementary", and "college" editions. The word bases are statistically compared to words in other dictionaries of the same level.

When a teacher, at any grade level, uses the LearnWords Device to study letter and sound correspondences for one and two syllable words, results are produced for all three phonetic development levels shown under Item 1 in FIG. 3.

These outputs provide the teacher some basis for assessing student or class performance relative to all three database outputs. Outputs are labeled with a B, E, or F corresponding to the three stages of phonetic development. Typical outputs from the Concept Demonstrator will be covered later under Item 5 in FIG. 3 on Instructional Approach.

The number of one and two syllable words implemented in the Concept Demonstrator for the three development phases are as follows:

| Phase | One-syllable Words | Two-syllable Words |
| --- | --- | --- |
| Beginning | 1360 | 886 |
| Elementary | 3098 | 5113 |
| Final | 4568 | 12321 |

Two-syllable compound words are not included in this count since these words are handled separately.

The database for the Final Phase contains all of the phonetic characteristics for the first two phases. The databases for the Beginning and Elementary Phases are simply just word lists. As a result, in the final embodiment of the invention the User may be given the capability to tailor the lexicons for these phases by substituting appropriately selected word lists from other sources. For example, if a school system decides that all eighth grade students should know all one and two syllable words in List A and that all third grade students should know all one and two syllable words in List B then List A and B can be substituted for the Elementary and Beginning lexicon in the LearnWords Device. In this way, all teachers in the school system will have standard word lists for measuring the progress of their students.

Syllable Structure

Although there are many sound irregularities in the English language, it is an alphabetic language. That is, there is a high degree or regular correspondences between the letters of a word and the sounds of a word. The LearnWords Device can be used to show both the regularity and irregularity of letter and sound correspondences for various word databases. The approach is based on a Syllable Structure as shown in Item 2 in FIG. 3.

Linguists normally deal in the sounds of a word and, consequently, syllable structure is defined in terms of sounds. The Onset is all consonant sounds preceding the vowel sound (the Peak) and the Coda is all consonant sounds following the vowel sound. To qualify as a valid English word the maximum number of and combinations of consonant sounds in the Onset and Coda of the syllable must conform to certain constraints. The Peak consists of a single vowel sound.

To determine the relationship between letters and sounds one can define a pseudo-syllable using letters rather than sounds as the basic building blocks. In this case the pseudo-syllable Onset consists of all letters before the vowel letter and the Coda consists of all letters following the vowel letter. The Peak consists of all vowel letters. Unlike the sound syllable that has a single vowel sound Peak, the Peak of the pseudo-syllable can contain more than one vowel letter as a result of digraphs and trigraphs, which are vowel letter combinations corresponding to a single vowel sound.

The words knot and main are used in the figure below to illustrate how syllable structure is used to establish correlation between letters and sounds. The use of vertical lines about a letter indicates the sound of the letter.

|  | Onset | Peak | Coda |
|---|---|---|---|
| Case 1: knot |  |  |  |
| Word: | kn | o | t |
| Phone: | \|n\| | \|o\| | \|t\| |
| Case 2: main |  |  |  |
| Word: | m | ai | n |
| Phone: | \|m\| | \|a\| | \|n\| |

In Case 1, it is apparent that the sound |n| corresponds with the two letters, kn. To establish this fact one can ignore the Peak and Coda and simply compare the Onsets of the Word and Phone. Similarly, in Case 2, it is again apparent that the long vowel sound |ā| corresponds with the two letters, ai. This fact is established by comparing only the Peaks of the Word and Phone and ignoring the Onsets and Codas.

These simple examples illustrate that if one searches a large list of words in order to find the correspondences between letters and sounds in, say, the Onsets of words the search will be faster if one only looks at the Word and Phone Onsets and ignores the Peaks and Codas.

When there are many words to search, one can do this very effectively by applying the Syllable Concept Method to a computer Database.

A Database consists of a number of Recordsets. Each Recordset in turn consists of a set of Fields and each Field stores a piece of data that is related to data in the other Fields of the Recordset.

Using the Syllable Concept Method as outlined above, Recordsets for the words knot and main appear as follows:

| | | | Fields | | | | | | |
|---|---|---|---|---|---|---|---|---|---|
| | Index | Word | Phone | OW | PW | CW | OP | PP | CP |
| Recordset #1 | 1 | knot | not | kn | o | t | n | o | t |
| Recordset #2 | 2 | main | mān | m | ai | n | m | ā | n | where OW, PW, and CW are respectively the Onset, Peak, and Coda of the word pseudo-syllable that in this document is called, the Word, and OP, PP, and CP are respectively the Onset, Peak, and Coda of the word syllable that in this document is called, the Phone.

By entering words in a Database in this fashion one is able to utilize the efficiency and speed of computerized searching, sorting, and summarizing to determine and display letter and sound correspondences of words in the Database.

This Syllable Concept Method of establishing letter/sound correspondences is used in the Concept Demonstrator for one and two syllable words. Additional Fields for data on stress, part of speech, prefixion, and suffixion are used with two-syllable words.

The technique outlined here for establishing one and two syllable word Databases can be extended to polysyllable words, however, for the Concept Demonstrator a different approach, Word Structural Stress Method, is used for larger words which is discussed later under Item 4 of FIG. 3 on Word Structure.

Major Vowel Sound Factors

By entering words in a Database using the Syllable Concept Method outlined above a large quantity of relationships between letters and sounds can be generated very rapidly. Presentation of this data for consonant sounds in Onsets and Codas is not a problem since consonant correspondences, generally, do not depend on other factors in a word. On the other hand vowel letter/sound correspondences are affected by other word features.

Major word factors having an impact on vowel letter/sound correspondences are shown in Item 3 of FIG. 3. In looking at the pseudo-syllable and syllable for the word main one can see that the digraph vowel, ai, can have the same long |ā| sound as is found in the word same(sām) which terminates with a silent "e". Although both a single vowel letter and a vowel digraph can have the same sound correspondences the constraints and limitation for these two types of Peaks are different and the letter/sound relationships must be analyzed separately.

While consonant letter/sound correspondences are mostly immune to the surrounding letter environment, vowel letter/sound correspondences are influenced by syllable structure as indicated by number 2 of Item 3 of FIG. 3.

Linguists have defined two major syllable forms: Open Syllable and Closed Syllable. An open syllable is terminated by a vowel sound and a closed syllable is terminated by a consonant sound. By the inherent nature of the English language there are general restrictions on the type of vowel sounds that can occur in open and closed syllables. Although details on these vowel sound restrictions will not be covered here, it is important to note that vowel letter/sound correspondence data must be presented in a manner that considers the effects of Syllable Structure and vowel letter environment on vowel sounds.

The LearnWords Device accounts for the vowel sound restrictions by presenting letter/sound correspondences for a variety of syllable forms. Two of the more important and most regular syllable forms are given below:

| Form | Example | Expected Vowel Sound |
|---|---|---|
| -VCe | Make (māk) | Long |
| -VC(C) | bed (bed) | Short |
|  | band (band) | Short | where V indicates a vowel, C a consonant, e a silent e, and C(C) one or more consonants.

These syllable forms will be used in the discussion of the Instructional Approach, Item 5 of FIG. 3.

Before leaving this topic it should be noted that syllable form effects discussed above are only relevant to a single vowel letter. Vowel letter/sound correspondences for digraphs and trigraphs are only modestly influenced by syllable form. One exception is a digraph before the letter, r, as in the form, -VVre, and this form is discussed below.

The next factor, number 3 of Item 3, is a major exception or constraining condition on the vowel sound relationship to syllable form. If the letter, r, follows a single vowel letter, the vowel sound is altered from the sound which is present when most other consonant letters follow the vowel. This effect is so regular that an output category is set up for the letter combination, Vr, in the output of the LearnWords Device.

There are other consonants besides the letter, r, which when either preceding or following the single vowel letter impacts vowel letter/sound correspondences. Three examples are the letter, w, before the vowel letter, a, as in the word, wad(wäd); the letter, I, after the vowel letter, a, as in the word, ball(bôl); and the letters, nd, following the letter, i, as in the word, kind (kīnd).

The above letter combinations and a few more like them that produce a small number of exceptions are classified as minor sound patterns. In the LearnWords Device these minor sound patterns are treated as exceptions or irregularies of the major sound guidelines. As will be discussed later under Instructional Approach, Item 5 of FIG. 3, the outputs of the LearnWords Device provides a way for the User to find and identify minor sound patterns as distinguished from isolated exceptions.

A vowel digraph in a stressed syllable of the form -VVre tends to have a different sound than the same digraph in a syllable of the form -VVrC(C) or -VVr. This variation with the letter, r, is taken into account for digraphs in LearnWords outputs. While there is a slight tendency for other letters to cause or appear to cause a specific letter/sound correspondence for a preceding digraph, like the letter, k, following the digraph, oo, as in, -ook, these combinations are treated as minor sound patterns which the User can identify and select from LearnWords output data.

In multisyllable words each syllable can have one of three stress levels: primary stress, secondary stress, or no stress. Syllable stress, the vowel sound factor number 4 in Item 3 of FIG. 3, has an impact on vowel sound quality. Or, more appropriately, it is the lack of syllable stress that has the greater impact on sound quality for multisyllable words.

If a syllable has either primary or secondary stress vowel letter/sound correspondences are the same as if the syllable were a one-syllable word. If the syllable has no stress, however, its vowel sound will frequently be reduced. The most common reduced vowel sounds are the Schwa |ə| sound as represented by the letter a in the word above(ə buv'), the short |i| sound corresponding with the letter a in the word message(mes'ij), and the long |ē| sound represented by the letter y in the word funny(fun'ē). Consequently, in multisyllable words syllable stress distribution must be taken into account to determine whether full vowel or reduced vowel sounds are involved. For syllables with primary or secondary stress full vowel sounds are always present, however, with an unstressed syllable either full or reduced vowel sounds can be involved although most often the vowel sound is reduced. In any case, the LearnWords Device must provide the User relevant stress information along with the appropriate vowel sound quality.

Word Structure

The phonetic emphasis in the study of one-syllable words is on the correlation of word letter and word sound patterns.

For two-syllable words phonetic emphasis still remains on letter/sound correspondence but the introduction of word stress adds a new phonetic dimension. Stress, or the lack there of, introduces reduced vowel sounds to the letter/sound correspondences as discussed above.

Stress, or the lack there of, also introduces the possibility of a consonant/vowel sound interaction called palatalization which causes a sound change for the consonant/vowel pair. An example of palatalization occurs in the word, motion(mō'shən). In this case the, ti, combination under the condition of no stress has caused the position of articulation of the |t| sound to shift slightly rearward in the mouth thereby producing the palatal, |sh|, sound. The User of the LearnWords Device can explore the sound consequences of palatalization in some detail within the two-syllable lexicon of the LearnWords Device. This exposure is important because palatalization occurs often in polysyllable words.

Almost all of the letter/sound correspondences of English are included in the lexicon of one and two syllable words. As a result, as a student moves on to the study of polysyllable words the emphasis shifts from letter/sound correspondences to Word Structure and its influences on word stress and pronunciation. Consequently, the emphasis of the LearnWords Device also changes for instructional use with polysyllable words. For one thing, students studying polysyllable words are old enough and mature enough to independently operate the LearnWords Device to look for word pronunciation patterns, to select and listen to word pronunciations, and to look up word definitions.

The major factors of Word Structure incorporated in the LearnWords Device are shown in Item 4 of FIG. 3. There are five word Databases for this area of instruction as follows: Polysyllable Simple Words, Polysyllable Complex Words, Simple Compound Words, Pseudo-compound Words, and Technical Words. The Databases for these words all have a field that contains the word stress pattern, developed by the Word Structural Stress Method, which facilitates sorting and displaying words with similar stress patterns. The Technical Words Database consists of separate lexicons of selected technical polysyllable words for the academic fields of Medicine, Law, Physics, Chemistry, Botany, Zoology, and Geology. The LearnWords Device is designed to accommodate expansion and/or substitution of specific Technical lexicons.

The databases for words listed in Item 4 in FIG. 3 have similar features in that for all cases the word, the word's phonetic spelling, and the Word's Structural Stress pattern are included as the principal fields of the databases' recordsets. In the case of pseudo-compound words two additional fields are used to indicate which words have a free root ending and which have a monosyllable ending.

The Word Structural Stress Method field is obtained by analyzing the stress on each syllable, working from the back of the word forward, and tabulating the pattern in a code. For example, the word microminiature(mī⊙krōmin'ēə chər) has the stress code, bbbpbs, where, b, indicates a syllable with no stress; s, indicates a syllable with secondary stress; and, p, indicates a syllable with primary stress. Sorting the database on the Word Structural Stress field groups together all words with common stress patterns.

For all word classes in the Word Structure category the User selects the specific types of words to be returned as outputs. There are three types of outputs available to the user as follows:

1. Visual output of word lists and phonetic spellings displayed on the computer screen,
2. Pronunciation outputs through the computer's speakers, and 3. Word definition outputs in a screen display provided by the "talking" dictionary or internally stored information.

The visual word list outputs are sorted based on the Word Structural Stress pattern field so that the User can view syllable characteristics of words with similar stress patterns. The visual word list output is the primary display and is always available. The word pronunciation and word definition outputs are activated by the User who uses the computer mouse to point and click on words he wants pronounced or defined.

All complex words in the polysyllable word class have a suffix. The User selects word lists for this class by choosing a specific suffix from an input list. Based on this input, a word list is displayed along with a display of the definition of the suffix and rules for word stress pattern associated with the selected suffix.

For the pseudo-compound words, which are words with prefixes of Greek or Latin origin containing two or more syllables, the User can select word lists by choosing a prefix type, a root type, or an ending type. The User can also select word list options based on whether the word has a free root ending and/or a monosyllable combining form word ending attached to the prefix.

In the case of words in the Technical lexicons, the only initial input from the User is a computer mouse selection of the desired lexicon from a list of those available. The lexicon words and phonetic spellings are presented on a scrollable screen display. The User can then use the computer mouse to select a specific word to hear a pronunciation of the word and/or see a display of a dictionary definition of the word.

Instructional Approach

The concepts embodied in the LearnWords Device are designed so that beginning and experienced language teachers and advanced students can perform self-directed learning on the sound patterns of American English.

A summary of potential Users and Uses of the LearnWords Device is given in FIG. 4. Because the Device gives the User considerable flexibility on inputs and outputs as listed in Item 5 in FIG. 3 on Instructional Approach and because of the creativity of teachers and students, it is difficult to forecast all of the uses for the LearnWords Device; however, some design aspects of the Concept Demonstrator are used below to illustrate different instructional and operational scenarios.

Successful operation of the LearnWords Device depends on the User being knowledgeable and skilled in common desktop computer functions: turning the computer and peripheral equipment on and off, installing a new program, opening and closing files, and using the keyboard and mouse.

If a prospective User does not have basic computer skills, he will need training covering these skills before using the LearnWords Device. Additionally, for computer users who have basic skills but have never used input controls like Option Buttons, List Boxes, and Text Boxes and who are not familiar with "wildcard search" methods will need supplemental training covering these items.

All Users will need training in the specific operation and uses of the LearnWords Device. This training is sufficiently straightforward that individuals can use self-teach methods to learn operations and functions of the LearnWords Device relying on a Training Manual 10 as shown as peripheral equipment in the System Design of FIG. 1. The Training Manual includes sections on Operation, Function, and Examples.

Many school systems now are setup with banks of computers arranged in front or a large screen 9 for viewing instructor generated computer outputs from an LCD Projector 8 as illustrated in the System Design of FIG. 1. Using this method, a trained instructor can give effective class instructions on the operations and functions of the LearnWords Device in from three to six hours depending on phonetic and computer skill levels of class members.

Start Form

Further description of the LearnWords Device will make use of some operating scenarios as run on the Concept Demonstrator. These scenarios are representative of operations envisioned in the final embodiment of the LearnWords Device. When a User opens the LearnWords computer program, a Splash screen with the program title appears while the program is loaded. After loading is complete in a few seconds, the Start Form shown in FIG. 5 is automatically opened.

Figure 5:
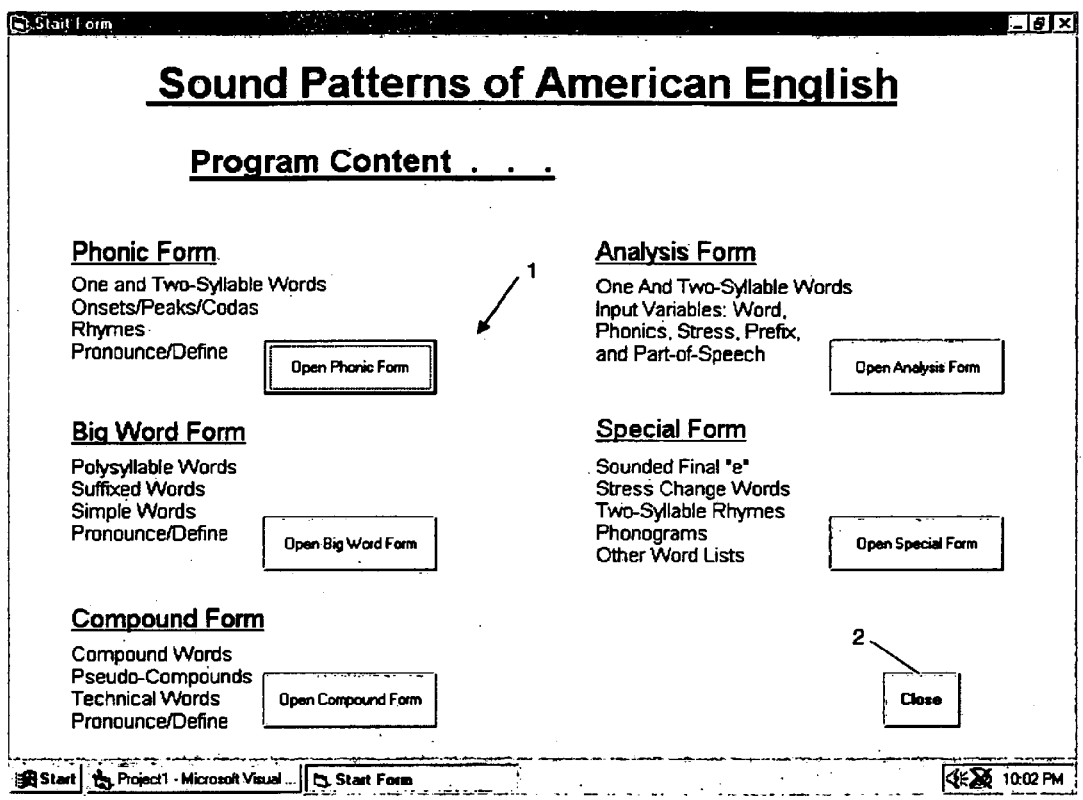
FIG. 5 and the remaining ten figures are various computer monitor screen views from the Concept Demonstrator. These views are used to describe the type of iterative processing that takes place based on User inputs.

As FIG. 5 illustrates, the Start Form presents a summary outline of LearnWords contents. Each major topic has a corresponding computer form. The User can access a form by clicking the associated command button 1 with the mouse. This action automatically opens the selected form. Once the User is through using the selected form there is a Return command button on the form that closes the selected form and shows the Start Form. In a sense, the Start Form is "Command Central" for the LearnWords program. All activity starts and ends on this form. The Close command button 2 unloads the LearnWords program.

Phonic Form: Count Form

Figure 6:
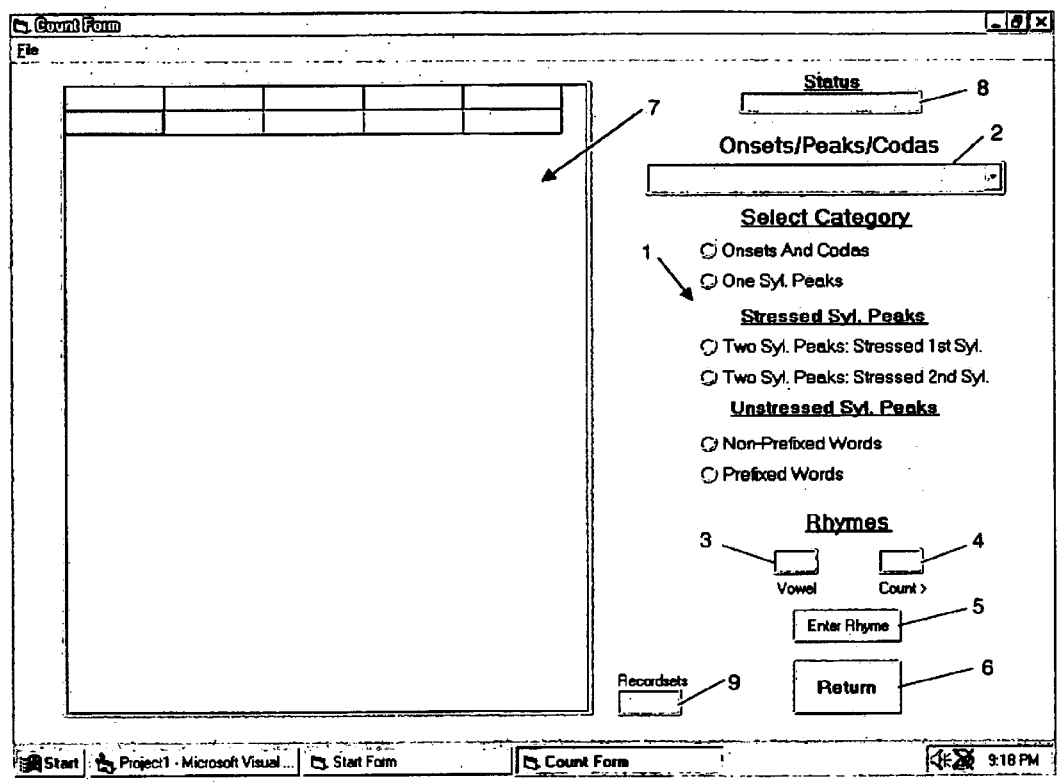
FIG. 6 is a screen view of the Count Form on first opening.

A typical learning cycle or session will be illustrated by use of the Phonic Form in the Concept Demonstrator. After the Start Form (FIG. 5) has opened the User clicks the Open Phonic Form command button 1. This action unloads the Start Form and opens the first Phonic Form called the Count Form as shown in FIG. 6.

Located on this form are the following four types of User input devices: option buttons 1, combo box 2, text boxes 3,4 and command buttons 5,6. Output devices on the form are a MSFlexGrid 7 and a text boxes 8,9. The output text box 8 alerts the User that a search is in progress or is completed. The other output text box 9 contains the number of Recordsets in the output.

The first step for the User is to select one of the option buttons 1 by the use of a mouse click on the button. This input loads the combo box 2 with choices related to the topic on the label beside the selected option button.

For example, if the User selects the Onsets and Codas option button 1 as seen in FIG. 7 the following six choices are loaded into the combo box 2:

1. One Syl. Word: Onset
2. One Syl. Word: Coda
3. Two Syl. Word: 1st Syl.; Onset
4. Two Syl. Word: 1st Syl.; Coda
5. Two Syl. Word: 2nd Syl.; Onset
6. Two Syl. Word: 2nd Syl.; Coda.

By clicking the down arrow 2 on the combo box 3, the above list is displayed in a dropdown list.

Each list item is associated with a stored Total Query resident in the LearnWords Database. The User can select one of the items in the list by clicking the item in the dropdown list using the mouse.

Clicking an item causes the Database to run a stored query and provide outputs to the MSFlexGrid 4 as seen in FIG. 7. If Item 1 above (One Syl. Word: Onset) is selected the FlexGrid is populated with 131 recordsets which look like the extracted sample of the last nine recordsets in the FlexGrid 4 as shown below:

| OP | OW | CountFX | CountEX | CountBX |
|----|----|---------|---------|---------|
| bl | bl | 59 | 38 | 11 |
| br | br | 88 | 55 | 21 |
| by | b  | 2  | 1  | 0  |
| dr | dr | 55 | 37 | 17 |
| dw | dw | 3  | 2  | 1  |
| fl | fl | 45 | 29 | 13 |
| fl | phl| 2  | 1  | 0  |
| fr | fr | 45 | 29 | 13 |
| fr | phr| 1  | 1  | 0  |

For the 131 recordsets the first field 5, OP, lists all of the possible Onset consonant sounds encountered in the 4568 one-syllable "final" lexicon representative of all the monosyllable words in a "college" edition dictionary. The second field 6, OW, lists all of the possible spellings for the Onsets. The third field 7 is a summation of the number or words in the database that have the spellings associated with a given Onset. The fourth 8 and fifth 9 fields list the number of words that have the shown spelling, OW, in the 3098 one-syllable "elementary" lexicon and the 1360 one-syllable "beginning" lexicon, respectively.

Looking at the extracted sample output shows that the consonant blends |bl|, |br|, |dr|, |fl|, and |fr| are numerous as one would expect. On the other hand, the consonant blend |dw| is rare appearing in only the three words dwarf, dwell, and dwine in the "final" lexicon. One can note that the consonant blend |y| is assigned to a single letter, b, which appears in the two words, beaut, and, butte. When the consonant |y| sound results, as in these two cases, it is considered as a shared effect between the consonant and the following vowel. In the LearnWords Device this type of |y| sound has arbitrarily been assigned to the Onset since |y| is a consonant sound.

One should note also that when consonant blends such as |fl| and |fr| in the sample table above have alternate spellings a recordset is generated and a count given for all alternate letter combinations corresponding with the blend sounds.

The outputs for the Onsets are sorted according to the number of sounds in the Onset. This groups together Onsets of three, two and one consonant sounds.

Here are some of the phonetic results a User can determine by looking at the 131 recordsets of the Onset's Total Query:

1. The maximum number of consonant sounds in an Onset of an English word is three,
2. The possible consonant sound combinations permitted in an Onset are constrained and conform to fixed patterns,
3. All three consonant sound Onsets begin with an |s| sound. (The database has one exception, the interjection, whew(hwy$\overline{oo}$), which has an alternate pronunciation, (wy$\overline{oo}$).)
4. When the sound count and letter count in the same recordset are not equal this indicates one of the following:
   A consonant digraph in the column, OW, such as sh, ch, th, or ph or the consonant trigraph, sch, that appears in German and Yiddish loan words,
   A consonant or vowel letter that has no sound correspondence that is commonly referred to as a silent letter. (An example of a silent vowel letter is the, u, in guide(gīd)),
   A creation of the |y| consonant sound as an interaction of selected consonants and the long u sound, |$\overline{oo}$|, or this vowel sound occurring at the start of a word,
   A consonant sound in a word that begins with a vowel letter. Examples are the words one(wun) and use(y$\overline{oo}$s),
   A word starting with a silent, h, preceding a vowel. An example is the word hour(our), and
   If both the, OP, and, OW, columns in a recordset are empty this indicates that the word starts with a vowel sound and has no Onset. There are 169 one-syllable words of this type in the "final" lexicon.

By comparing frequency counts between the three lexicons (FX: "college" 7, EX: "elementary" 8, and BX: "beginning" 9) the user can obtain an appreciation how the frequencies of one-syllable word Onsets may change as a student progresses to higher academic levels.

Up to this point a User has gained substantial phonetic information about Onset letter/sound correspondences but how is this information translated into specific words? When the User wants to see the words associated with the numbers of the letter/sound correspondences, the User uses the mouse to click on the sound column 5 in the recordset of interest. This User input hides the Total Query form and opens a form with the desired words, for all three lexicons, displayed in a new FlexGrid.

Everything discussed so far also applies to the analysis of the Coda of one-syllable words. The Coda counts are obtained by selecting, 2. OneSylWord: Coda, from the dropdown list shown above. Additionally, the User can investigate the Onsets and Codas in each syllable of two-syllable words by selecting the appropriate input from the dropdown list.

Before looking at the form to view words associated with Onset and Coda in the Total Query an explanation will first be given on how a User obtains letter/sound correspondences for Peaks of one-syllable words.

While correspondences for Onsets and Codas are relatively straightforward, syllable type and other word elements as pointed out in Item 3, FIG. 3, on Major Vowel Sound Factors complicate summarizing letter/sound correspondences for Peaks.

When the User wants to analyze vowel letter/sound correspondences of one-syllable words, he uses the mouse to select the option button on the Count Form (FIG. 8) labeled One Syl. Peaks 1. This User input causes the Combo Box 2 to be loaded with the following choices:

| User Peak Choices | Regular Correspondences |
|---|---|
| 7. One Syl. Word: Closed Syl. < >r; Peak | Short Vowel Sound Set |
| 8. One Syl. Word: Closed Syl. =r; Peak | R-Modified Short Vowel Sound Set |
| 9. One Syl. Word: -VCe End < >r; Peak | Long Vowel Sound Set |
| 10. One Syl. Word: -VCe End =r; Peak | R-Modified Long Vowel Sound Set |
| 11. One Syl. Word: -VCCe End < >r; Peak | Short Vowel Sound Set |
| 12. One Syl. Word: -VCCe End =r; Peak | R-Modified Short Vowel Sound Set |
| 13. One Syl. Word: -V End; Peak | Word End Vowel Sound Set |
| 14. One Syl. Word: -VV-; Peak | Digraph Vowel Sound Set |
| 15. One Syl. Word: -VVr-; Peak | R-Modified Digraph Vowel Sound Set |

The choices correspond to different syllable types and vowel letter types that influence vowel letter/sound correspondences. The regular correspondences that the User can expect are shown above. These letter/sound sets are established by selecting the most regular occurrences for a given syllable/letter type. They are not presented to the User in the Combo Box 2 but rather are covered in the LearnWords Training manual 10 (FIG. 1). As these choices indicate, understanding Peak sound correspondences is more complex task than the same understanding for Onsets and Codas.

Associated with each of the nine Peak choices loaded in the Combo Box is a Total Query in the LearnWords Database 1 (FIG. 2). If the User wants to investigate vowel letter/sound correspondences in closed one-syllable words in which the vowel sound is not followed by an |r| sound (indicated in the dropdown list by the symbol <>r), he selects the One Syl. Peaks option button 1 (FIG. 8) and then opens the dropdown list in the Combo Box 2 by clicking the arrow 3 and with the mouse clicks on the entry for number 7. One Syl. Word: Closed Syl.<>r; Peak.

This sequence of inputs activates the Total Query 4 and while it is being formed the Status text box 5 indicates to the User that a search is in progress. In a matter of seconds the search is complete and a MSFlexGrid 6 is populated with the 21 recordsets shown in FIG. 8. The first column 7 labeled, PW, contains the Word vowel letter Peak while the second column 8 labeled, PP, holds the Phone vowel sound Peak. The last three columns contain the summation of the letter/sound correspondences for the three academic level lexicons as previously described. The recordsets are sorted according to the vowel letter in column one. In this manner the sound correspondences for a given vowel letter are grouped together. For example, in the "college" lexicon 9, labeled CountF, the letter, a, corresponds to five different vowel sounds with the frequencies shown.

An overview of the frequency numbers shows that the vowel letters predominately correspond to the short vowel sounds for this syllable choice which is a closed syllable without a sound |r| following the vowel or a word ending silent "e'. These most frequent vowel letter/sound correspondences define the Short Vowel Sound Set given in the above table under the title, Regular Correspondences. One can use the numbers in the FlexGrid 6 to get an overall percent of regularity for this sound set. For the "college" lexicon 9 the sound set regularity is 87 percent, with regularity of the individual vowel letters ranging from a high of 99 percent for, e, to a low of 81 percent for the letter, o.

Phonic Form: Word Form

After studying the ramifications of the frequencies of occurrence of the various vowel letter/sound correspondences one can look at the words which are irregular relative to the listed sound set to see if some minor sound patterns exist. To look at the words associated with any given recordset the User needs only to dick with the mouse in the vowel letter column 7 of the recordset of interest.

Figure 9:
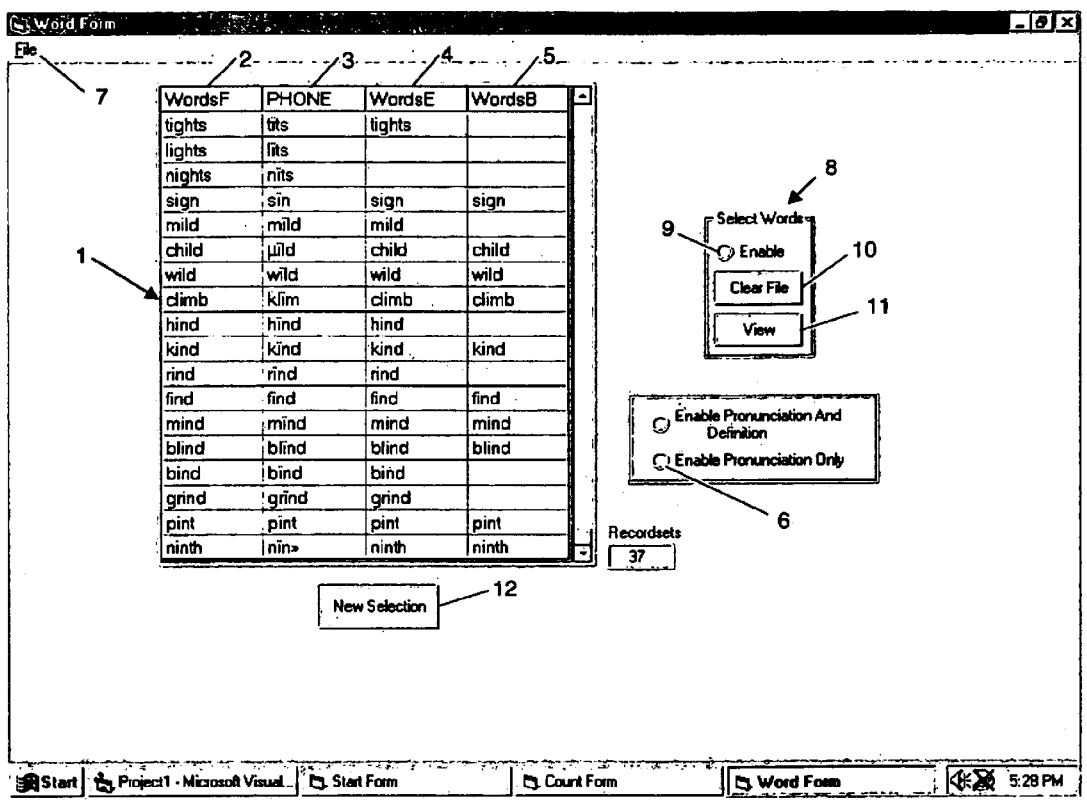
FIG. 9 is a screen view of the Word Form after a User selects a long |i| vowel sound on the Count Form.

For example, if the User wants to know why there are so many long |i| 10 sounds he clicks on the letter, i, 11 in the, PW, column 7 of the recordset with the long |i| sound. This User action generates an SQL Select Query to obtain all words with the required letter/sound correspondence. The action closes the Count Form (FIG. 8) and opens the second Phonic Form called the Word Form (FIG. 9) to receive the outputs in a MSFlexGrid 1. The computer output screen for the present example is shown in FIG. 9.

The first column of the FlexGrid contains the 37 words from the "college" lexicon 2 in which a consonant ending closed monosyllable word contains a single letter, i, that corresponds to the long |i| sound. The phonetic spelling of the word is given in the second column labeled Phone 3. The 30 and 19 words of this type from the "elementary" and "beginning" lexicons are presented in columns labeled WordsE 4 and WordsB 5, respectively.

The first 19 of the 37 words from the "college" lexicon are words like, might, bright, light, etc., ending in the letters, -ight, with common sound, |it|. The letter combination, -igh, is a well-known minor letter pattern corresponding with the long |i| sound since in this case the, gh, pair can be considered silent letters. The FlexGrid 1 has been scrolled down to expose the other 18 words in this category. The first three words have the same, -igh, letter pattern as the first 19 words. Other words with the -ign, -ild, and -ind letter patterns fit the category of corresponding with a minor sound pattern. One thing the outputs at this time do not show is the answer to the question, "If the endings like -igh, -ind, -ild, and -ign are taken as minor sound indicators for the long |i| sound are there any words with these letter patterns which are exceptions". The User will be able to find the answer to this question by using the Analysis Form, which will be shown later.

A teacher can use the Word Form (FIG. 9) for individual, small group, or class instruction. For individual and small group instruction the teacher can select irregular sound words from the Word Form for the students to study. By placing a "talking dictionary" disc in the computer's ROM drive and clicking the option button 6 next to the label Enable Pronunciation Only the LearnWords Device is set up for aural outputs. By showing the students how to use the computer mouse to click on words in the first column 2, they can hear the words pronounced and in this manner actively associate word sounds with word forms.

If a different set of words is desired, the teacher can click the command button 12 labeled New Selection. This action closes the Word Form (FIG. 9) and returns the User to the Count Form (FIG. 8). Another selection can be made to obtain a new word list by clicking a letter in the Word Peak column 7, PW (FIG. 8). This action causes the Count Form (FIG. 8) to close and causes the Word Form (FIG. 9) to reopen with a new list of words. This interative process can continue or be terminated based on the teacher's lesson objectives.

For class instruction the teacher can print out a copy of the words that appear in the FlexGrid 1 by activating the Print command in the File Menu 7. If he wants to tailor the list to better supplement his teaching plan, this can be done by using the control labeled Select Words 8. After activating this control by clicking the option button titled Enable 9, the teacher can select with the mouse any word in the first column 2 and this word will be appended to the SelectWord file.

Figure 10:
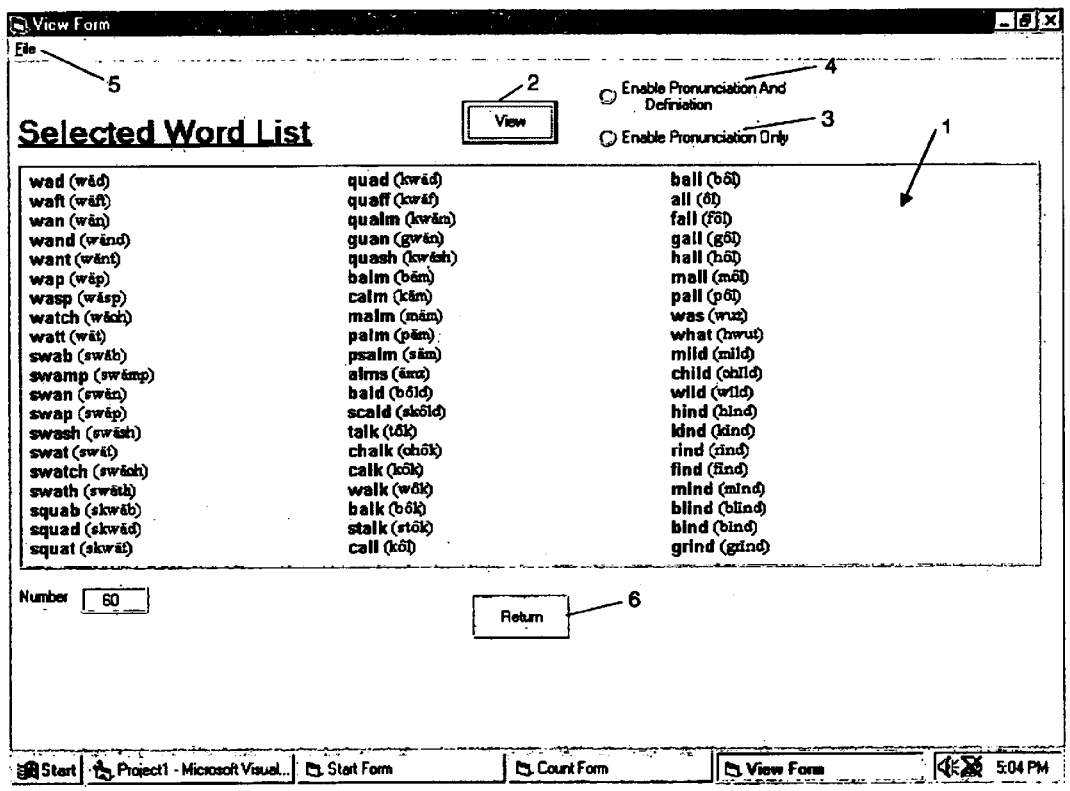
FIG. 10 is a screen view of the View Form after the User has loaded a file and selected the View Form.

The SelectWord file has three modes of operation: Clear, Append, and View. The Clear mode deletes all words in the SelectWord file. This action occurs only if the Clear File command button 10 is clicked. The Enable option button 9 activates the Append mode that remains in effect until the form is closed. Note, however, that the Clear File command button 10 can clear the SelectWord file even though the Append mode is in effect. Clicking on the View Command button 11 activates the View mode of the SelectWord file. This input closes the present form (FIG. 9) and opens the View Form (FIG. 10).

View Form

When the View Form (FIG. 10) is first opened, the text area 1 is blank. The User clicks the View command button 2 at the top of the text area and a list of selected words, along with a list of phonetic spellings, is loaded into the text area 1 for viewing.

Clicking the View command button 2 causes the LearnWords input computer program (FIG. 2) to open the SelectWord file, format the data and display the words in the text area 1. A teacher can generate a SelectWord file in three different ways: Immediate, Stored, or Generated. In the Immediate mode the teacher uses the Select Word controls located on various word forms to select a word list and then clicks the View command button 2 on the word form to immediately view the list or show students the list. In this mode of operation the SelectWord file is usually cleared after each use.

In the Stored mode the teacher uses the Select Word controls on a word form to enter words into the SelectWord file in the same manner as if she were going to immediately view the words. After loading the SelectWords file, the teacher opens the File Menu on the word form and uses the standard computer Save As method to save the word file under a different name in a designated directory. In this manner the teacher can build archives of stored word lists for later use. To use a stored list in the LearnWords Device the teacher reverses the SaveAs process by designating the SelectWord file as the receiving file. A dialog box will open with the message "The SelectWord file already exists. Do you want to replace the file?" and the teacher clicks the Yes command button in the dialog box. The SelectWord file now contains the word list from the stored file.

In the Generated mode the teacher uses any word processor installed on her computer to create a text file consisting of a list of words. Generated word lists can be stored in the Stored word archives or the Save As file command can be used to load the word list into the SelectWords file for immediate use.

For all three modes of creating word lists, the resulting SelectWord file is useable until the Enable button in the SelectWord control group is activated and either the Clear File button is selected or the teacher selects words in a FlexGrid. In the latter case these words are appended to the existing SelectWord file. Neither of these actions will alter the word files the teacher has stored in another directory.

To use the Stored and Generated modes, the teacher can pre-load the SelectWord file either before or after the LearnWords Device is turned on. After the LearnWords Device is activated the teacher can use any form that has SelectWords controls to gain access to the View Form by selecting the Enable button and then clicking the View command button. To use the Intermediate mode the teacher selects the Enable button, clicks the Clear File command button, selects the desired list of words by clicking on the words in a FlexGrid control, and then clicks on the View command button.

For all three of the modes, after the View command button in the Select Word control group is selected the View Form is opened but the text area is empty. The User must click the View command button at the top of the text area in order to activate the output software program to open, format, and display the words in the SelectWord file.

The View Form with a loaded text area is shown in FIG. 10. The User can study the phonetic spellings of the words displayed in the text area. In addition the User can hear a pronunciation and, if desired, read a definition for any word listed in the text area.

There are at least two mechanization options with the LearnWords Device to provide word pronunciation and definition outputs. The necessary data can be stored in the word Database or the data can be obtained from a "talking dictionary" by the use of standard SendKeys programming methods. There are implementation and operational advantages and disadvantages for both approaches and a final embodiment of the LearnWords Device may use either approach. Since the Concept Demonstrator uses the "talking dictionary" approach this method is used here to illustrate the principles involved.

In order to hear a word pronunciation and see a word definition the User loads a commercially available "talking dictionary" disc into the computer's ROM drive before or after the LearnWords program is activated. A SendKeys programming method requests Information from the dictionary. By using the SendKeys method words are automatically "typed" into the input text box of the dictionary in a manner similar to a person using the computer keyboard to type a word directly into the dictionary's text box.

The loaded View Form in FIG. 10 is used to explain the sequence of events for obtaining word pronunciations and/or definitions. After the words are loaded in the text area 1 of the View Form (FIG. 10) and the "talking dictionary" disc is inserted in the ROM drive, the User can activate pronunciation of a word by clicking the option button 3 above the text area labeled Enable Pronunciation Only. From this point on anytime the User clicks on a word in the text area 1 the SendKeys method is used to activate the "talking dictionary" and the User will hear the word pronounced. In the Pronunciation Only mode the User can click on any other word just as soon as the currently selected word's pronunciation is complete. In this manner the User can pace the speed of hearing the words pronounced. The pronunciation mode permits the user to see the word and its phonetic spelling while the word is being pronounced thereby reinforcing the association of word form with word sound.

If various words are unfamiliar to a User, the User can activate the option button 4 labeled Enable Pronunciation And Definition. Then as the User clicks a word the SendKeys method is used to activate the "talking dictionary" and the word is not only pronounced but the dictionary display remains open on the screen and the User can read the definition of the word. When the User is through reading he clicks anywhere outside the dictionary display area and the dictionary is removed from in front of the View Form (FIG. 10). The User can now click another word in the text area 1 to hear it pronounced and to see its definition.

In addition to viewing words with the View Form, the User can also make a printout of the selected word list by using the print command located in the File Menu 5 dropdown list.

The pronunciation and definition functions associated with the View Form are used on several other forms in the LearnWords Device. The principle of operation is the same in all cases except that in other forms the words can be selected directly from a FlexGrid without using the Select Word controls. The purpose of the View Form is to provide the teacher with a way to tailor outputs to meet the specific needs of students or to create word lists that supports a specific lesson plan.

When the User is through with the View Form (FIG. 10), he clicks the Return command button 6. This action returns the User to the main form from which he entered the View Form. In the present case the User is returned to the Count Form (FIG. 9) and he can make a new selection from this form.

The above material describes all of the Select Category output methods associated with User inputs and choices on the Count Form shown in FIG. 6. A brief discussion was given earlier on inputs for one-syllable word Codas and one case for one-syllable word Peaks. The labels beside the option buttons 1 on the Count Form in FIG. 6 indicate the top-level input for the User. Connected with each option button are from 6 to 11 choices the User makes to obtain counts of letter/sound correspondences.

The User has a choice of 52 Stored Total Queries and 42 of the choices are associated with the vowel/sound correspondences. A representative list of choices was presented above for the One Syl. Peak option button. The remaining 4 option buttons for Peak inputs have a list of choices similar to the One Syl. Peak list. The list choices are created in the Combo box 2 when the User selects an option button 1. To see the list the User clicks the arrow on the Combo box 2 and a dropdown list appears. The User clicks on one of the choices and this input causes one of the Stored Total Queries to run and provide count outputs to the MSFlexGrid 7.

The two-syllable word peaks are separated into two groups: Stressed and Unstressed Syl. Peaks. The reason for this is that vowel sounds are, in general, reduced sounds when the vowel is in an unstressed syllable.

The Unstressed Syllable Peaks are further divided by whether the word does or does not have a prefix. This separation is made because some unstressed prefixes have unreduced vowel sounds for reasons not associated with stress alone. Also, two-syllable prefixed words that are stressed on the first syllable tend to have more full vowel sounds in the unstressed second syllable than is the case for non-prefixed words.

The last phonetic input on the Count Form (FIG. 6) is used to obtain a count of Rhymes in the three one-syllable lexicons in the Database. A Rhyme consists of the combination of the Peak and Coda. By entering the phonetic symbol for a vowel sound in the text box 3 labeled Vowel, under the heading Rhymes, all Rhymes in the three lexicons with the entered vowel sound are counted. For example, in the word band(band) the Peak is the short vowel sound |a| and the Coda is the two consonant sounds, |nd|. The Rhyme, then, is the sound, |and|. Some other words that have Rhymes the same as the one in band are and, hand, land, and sand. Groups of rhyming words are used frequently to teach beginning and foreign language students the English vowel sounds. In this use the sound groups are usually referred to as Phonograms.

Since two one-syllable words with the same Rhyme constitute a group the Rhyme lists, in some cases, can be very long. As a result, a text box 4 (FIG. 6) on Count is included as an input so that groups with less than the number entered in the Count text box will not be shown in the Count output. Usually a teacher wants at least five words in a group to illustrate a vowel sound.

An SQL query statement is formed using the Vowel and Count inputs when the User clicks the Enter Rhyme command button 5. A sample count output is shown below for the vowel input of a short |a| sound and a word count greater than 19.

| PP | Rhyme | CountF | CountE | CountB |
|----|-------|--------|--------|--------|
| a | ash | 25 | 20 | 7 |
| a | angk | 22 | 19 | 4 |
| a | ad | 21 | 17 | 8 |
| a | ag | 23 | 16 | 5 |
| a | ak | 32 | 23 | 7 |
| a | am | 24 | 17 | 9 |
| a | ap | 25 | 18 | 8 |
| a | at | 28 | 18 | 12 |

The first column is the Peak or short vowel sound |a| and the second column lists all Rhyme sounds starting with the Peak sound |a| that have more than 19 words in the group for the "college" lexicon, CountF. The columns labeled CountE and CountB show the number of words for a given Rhyme for the "elementary" and "beginning" lexicons, respectively.

Again, as in the count cases for Onsets, Peaks, and Codas, the User can click in the first column of any of the Rhyme count recordsets and the list of words making up the count are presented automatically on the Word Form. All the previously described outputs on the Word Form can be used with the Rhyme word list.

The last User input on the Count Form is the command button 6 labeled Return. Clicking this button returns the User to the Start Form.

Analysis Form

Upon returning to the Start Form the User can Close the LearnWords program by clicking on the Close command button or continue using the program by selecting another program form.

Figure 11:
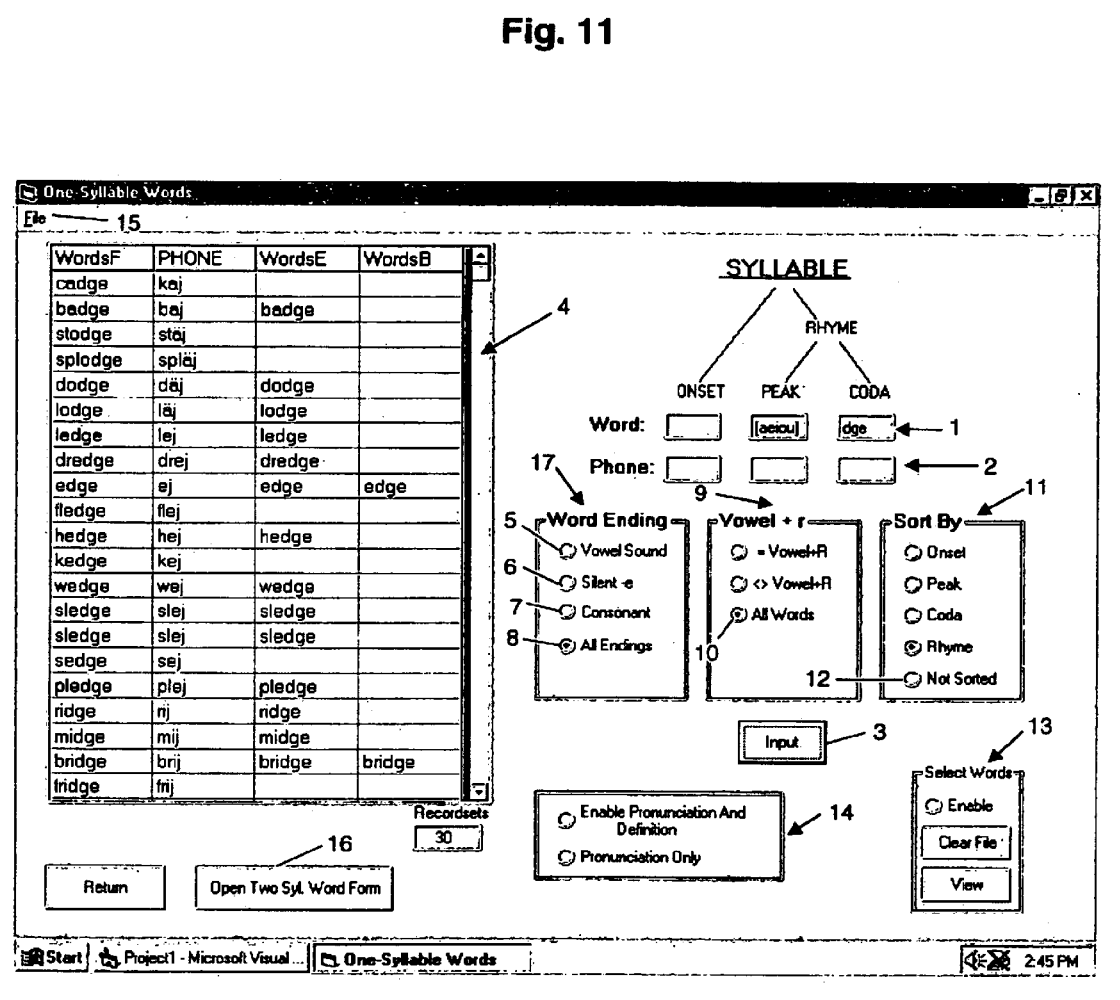

By clicking on the Open Analysis Form command button the Start Form is closed and the One-syllable Word form shown in FIG. 11 is opened. On this form is the command button 16 Open Two Syl. Word Form that a User clicks to open the Two-syllable Form shown in FIG. 12. Both the one and two syllable forms are designed to provide the User a way to obtain phonetic results that are not available on the Phonic Forms. These forms also permit the User to do independent research on one and two syllable word sound patterns.

Analysis Form: One-syllable Words

Features and operations of the One-syllable Word form are described first. The layout of the inputs on this form is designed to emphasize to the User the relationship of the Word pseudo-syllable with the Phone syllable and to aid the User in visualizing letter/sound correspondences.

On the One-syllable Word form are six text boxes in which the User types letter and sound commands as inputs to the LearnWords computer input program. Three of the text boxes are for Word inputs 1 and three are for Phone inputs 2. The text box entries all connect with computer programming Like Functions.

The Like Functions are used as criteria to obtain requested Words from the Database. Each of the six text box inputs then become criteria for comparison against the corresponding fields in the Database that contain Onset, Peak, and Coda data associated with the Word and Phone.

The computer process works as follows. If the User wants to see all words in the One-syllable Word Database that have, for example, a single vowel letter, a, that corresponds to the long |a| sound, he types the letter, a, into the Word Peak text box 1 and then types into the Phone Peak text box 2 the character for the long /a/. By the User clicking the Input command button 3 the two text box inputs are converted to Like Function criteria. An SQL Select Query statement is generated using the Like Function criteria with the respective Word and Phone Peak Fields in the Database to select only those words that have a letter, a, that has a long la sound.

The LearnWords computer output program then routes the selected words to the MSFlexGrid 4 control on the One-syllable Word form for the User to view. To obtain view words for all three lexicons the SQL Select Query statement includes appropriate database JOIN code.

The implemented Like Functions permit the User to use Wildcard computer search techniques in a manner similar to a Parameter Query. A few examples are given to illustrate the analysis capabilities for the One-syllable Word form.

If a User does not type anything into the text boxes on the form but does click the Input button 3, the FlexGrid 4 will be filled with the entire 4563 words in the one-syllable "college" lexicon and the complete lexicons for the other two learning levels.

On the other hand, if the User types any letter in the Word text boxes 1 or any letter sound symbol in the Phone text boxes 2 these inputs act as criteria to guide and constrain the outputs to the FlexGrid 4.

For example, if the User types, b, in the Word Onset text box 1; a, in the Word Peak text box 1 and, d, in the Word Coda text box 1 and then clicks the Input command button 3 the output to the FlexGrid 4 appears as follows:

| WordsF | Phone | WordsE | WordsB |
|--------|-------|--------|--------|
| bad    | bad   | bad    | bad    | since the word, bad, is in all three lexicons and its phonetic spelling is |bad|.

If the User replaces the letter, a, in the Word Peak text box 1 with the Wildcard search bracket, [], containing all the single vowel letters, [aeiou], and clicks the Input button 3 the system will take each vowel contained in the brackets (or any other letters enclosed in brackets) as search criteria to find matching words in the Database. When the Wildcard bracket, [aeiou], is used in the Concept Demonstrator as the Word Peak input the following FlexGrid output is obtained:

| WordsF | Phone | WordsE | WordsB |
|--------|-------|--------|--------|
| bad    | bad   | bad    | bad    |
| bed    | bed   | bed    | bed    |
| bud    | bud   | bud    | bud    |

The words bad, bed and bud match the input criteria and in addition these three words are all in the three separate lexicons.

The Wildcard bracket, [aeiou], was used for the Peak input along with Coda letter input, dge, to generate the FlexGrid 4 display in FIG. 11. The FlexGrid output contains all words in the three lexicons that have a, -Vdge, ending where, V, is one of the vowel letters contained in the Wildcard bracket, [aeiou].

The Wildcard bracket can also be used in an exclusive manner as well as in the above-described inclusive manner. The following example demonstrates this while showing how the One-syllable Word form can resolve a shortcoming of the Stored Query methods discussed earlier. When minor word patterns are detected by the use of the Count (FIG. 6) and Word (FIG. 9) Phonic Forms it was stated that with these Forms there is no easy way to answer the question as to whether the minor word patterns have any exceptions.

The minor sound pattern, -ange, in which the letter, a, has a long vowel sound is used below to illustrate the problem and solution. When this pattern is found using the Stored Query syllable form, -VC(C)e, one expects the short vowel sound |a| but instead the long |a| sound is given in the following five words: change, grange, mange, range, and strange. While this definitely looks like a minor sound pattern one must first ask the question, "Does the letter, a, have other sounds when it appears in the letter combination, -ange?".

The One-syllable Word analysis form (FIG. 11) can be used to see if there are any exceptions to this minor sound pattern. By typing the letter, a, into the Word Peak text box 1; the letters, nge, into the Word Coda text box 1; and the long |a| sound symbol, a, into the Phone Peak text box 2 and clicking the Input button 3, the output list are the same five words that are obtained from the Phonic Word form, as one should expect.

By using the Wildcard brackets in the following exclusive manner on the input of the Phone Peak 2 and leaving the Word Peak and Word Coda text box 1 inputs the same as above one can obtain any exceptions to the minor sound pattern. To make the Phone Peak exclusive of words with a long |a| sound corresponding to the letter, a, in the letter pattern, -ange, one types, [!a]. By using an exclamation, !, Wildcard character in front of a letter (or letters) enclosed in brackets that letter is excluded as a criteria in the search for word outputs. Using the new entry for the Phone Peak text box 2 when the User clicks the Input button the single word, flange(flanj), is the output. This output indicates that the minor sound pattern, -ange, has only one exception.

Two other Wildcard characters add considerable analysis capability for the One-syllable Form. The first is the question mark, ?, used in one of the text boxes. This notation indicates that any single character can satisfy the search criteria. As an example if a single, ?, is typed in the Phone Onset text box 2 and the Input command button 3 is clicked all words with a single sound Onset (2871 words in the "college" lexicon) are displayed in the FlexGrid 4. If two, ??, are typed into the Phone Onset text box 2 the output results in 1394 words with Onsets consisting of two consonant sounds and if three, ???, are typed in then 131 words with three consonant sound Onsets are displayed. If four, ????, are typed in nothing comes out because English words are constrained to Onsets with no more than three consonant sounds.

The, ?, can be used profitably in all of the text boxes. One good use is to segregate words by vowel type. If a single, ?, is typed into the Word Peak text box 1 all words with a single vowel letter occur in an output. Two, ??, results in all words with a digraph and three, ???, generate all words with a trigraph. When three, ???, are used in the Concept Demonstrator the following six words are displayed for the "college" lexicon: beau, beaut, buoy, heaume, lieu, and view.

The second additional Wildcard character that provides added analysis features is an asterisk, *, used in a text box. This notation indicates that none or any number of text characters in a test string can satisfy the search criteria. The following examples illustrate the effect of the asterisk, *, in a search criteria. If a User types the letter, a, in the Word Peak text box 1 and the letter, r, in the Word Coda text box 1 and enters these inputs into the LearnWords Device all words in the Database ending with the letters, ar, such as the word car, are displayed. On the other hand, if the, *, is typed after the letter, r, in the Word Coda text box as, r*, then the output displayed is all words ending in, ar, and, ar, plus any following letters. Example words that are displayed are car, arch, bare, harsh, quartz, warmth, etc.

By mixing Wildcard characters with letter and sound symbols in the Word and Phone text boxes almost all words and word groups in the one-syllable word lexicons can be displayed based on User inputs. This gives the User a great deal of flexibility in analyzing sound patterns.

The groups of option buttons (17, 9, 11) below the Word and Phone text boxes both supplement and facilitate search capabilities available from text box inputs.

The Word Ending group 17 permits the User to select the types of words for display depending on word ending. In the case of Vowel Sound 5 and Consonant sound 7 endings the Like Function associated with the Phone Coda text box 2 must be changed to the Is Null Function for vowel sound endings and to the Is Not Null Function for the consonant sound endings. The option buttons (5, 7) for these two respective cases provide the input to make this change. Without the change there is no way to segregate these two important word groups.

The Silent-e ending option button 6 is redundant in the sense that Silent-e ending words can be obtained by entering an asterisk followed by the letter, e, in the Word Coda text box 1 as, *e. The Silent-e option button 6 is with the Word Ending group to facilitate User input and to emphasize the importance of this syllable type on letter/sound correspondence. A teacher can use this form as a "show", "do" and "see" instructional tool.

The Vowel+r option buttons 9 are also redundant since these two segregated word groups can be obtained by the use of the Word Coda text box 1. To get the Vowel+r word group one types into the Word Coda text box, r*. To get the Vowel<>r word group (Words in which the vowel is not followed by the letter, r.) one types into the Word Coda text box, [!r]*.

Again, as is the case of Silent-e Word Ending, the Vowel+r group 9 is separately displayed for ease of input and to highlight this important vowel letter/sound relationship.

The Sort By group 11 gives the User some control over how the output words are sorted for display. As the emphasis of analysis shifts from one part of a syllable to another the User can sort words accordingly. The sort is on sounds and not letters. If the Not Sorted option button 12 is selected the words are displayed alphabetically since the words are sorted that way in the Database. The default option button positions for the three groups are All Endings 8, All Words 10, and Not Sorted 12.

The Select Words 13 and Pronunciation/Definition 14 controls on this form function in the same manner as previously described for the Word Form (FIG. 9). A hardcopy print out can be obtained by the use of the File Menu 15 as also described previously for the Word Form (FIG. 9).

Analysis Form: Two-syllable Words

A User accesses the Two-syllable Words form from the One-syllable Words form by clicking the command button labeled Open Two Syl. Word Form 16. This input action closes the One-syllable Words form (FIG. 11) and opens the Two-syllable Words form shown in FIG. 12.

The Two-syllable Words form provides the User methods for investigating letter/sound correspondences for two-syllable words beyond the correspondences provided by the Stored Queries on the Phonic Form.

The User can also do a limited amount of independent research on two-syllable word letter/sound correspondences using User generated inputs.

User inputs are of three types: variable, fixed, and stored. The variable inputs are selection criteria for the desired Word and Phone and consist of User generated code using letters and sound symbols in conjunction with Wildcard characters. Fixed inputs are choices the User makes from lists associated with word and sound characteristics. Also, fixed and variable inputs are used to get aural and visual outputs from a "talking" dictionary and hardcopy outputs from the printer. The stored inputs are choices of Stored Queries 15 that are provided to supplement outputs not available from User generated inputs.

User outputs are word lists and phonetic spellings, recordset totals, hardcopy printouts, and "talking" dictionary aural and visual outputs.

Figure 12:
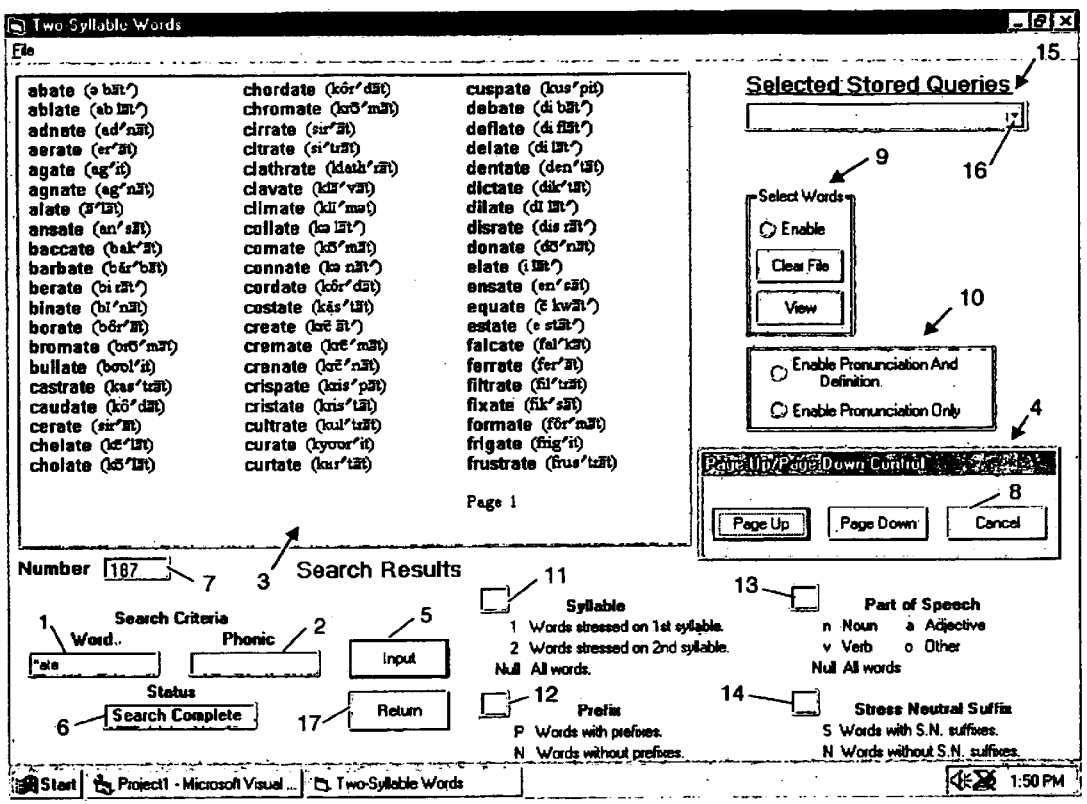
FIG. 12 is a screen view of the Two-Syllable Word analysis form after the User has entered an input.

The principle variable input methods require the User to type letters, sound symbols, and Wildcard characters in the text boxes shown in FIG. 12 labeled Word 1 and Phone 2. Finding all words beginning or ending with specified letters are examples of the use of Word text box entries. A User may be interested in seeing all words that end in a suffix form like: -ic, -age, -ate, -tion, etc. By typing the Wildcard asterisk and the ending -say for instance, -ate - in the Word text box as, *ate, one obtains all words with the, -ate, ending in the two-syllable "college" lexicon. The first page of this word list is given in the text area 3 in FIG. 12. The User can find similar word lists for other suffix type endings or any other word ending of interest by simply typing in the Word text box 1 an asterisk before the desired ending.

By entering prefix type letter forms followed by an asterisk in the Word text box 1, the User can obtain all words in the "college" level Database that begin with a prefix type form or another letter combination the User might want to enter.

The sequence of events that transpire when an input is entered in the Word text box 1 is explained below. When the form is first opened there is nothing in the text area and there is also nothing in any of the text boxes 1, 2. The Page Up/Page Down Control 4 is not visible until a word list appears in the text area 3.

The User types into the Word text box 1, *ate, and then clicks on the Input command button 5. The LearnWords input computer program transfers the, *ate, input to the SQL Software where a Select Query SQL statement is passed to the Database engine and a search is performed to find all words in the database ending in the letters, -ate. When the search starts the Status text box 6 has the word, Searching, appear as a green color entry.

The Recordsets that have a Word field that satisfies the, -ate, ending criteria are transferred, via a Data Control, to the Data Formatting Software. Appropriate font and display formatting are supplied and the first page of the word list is displayed in the text area. At this time, the Status text box 6 has the words, Search Complete, appear as a red entry and the total number of words found in the search shows in the Number text box 7. The total number of words for the, -ate, ending is 187 as seen in FIG. 12.

Since there are more total words than the allotted 60 that the text area 3 can accommodate a Page Up/Page Down Control 4 is used to scroll pages up and down. The Cancel command button 8 is used to clear the text area 3, hide the Control dialog box 4, and permit the User to input new parameters.

When the word list is available in the text area 3, the User can enable either the Select Words controls 9 or the "talking" dictionary controls 10. These two controls are mutually exclusive but one can be used and then the other. The functions of these controls are the same as described with the Word Form (FIG. 9).

The four text boxes labeled Syllable 11, Prefix 12, Part of Speech 13, and Stress Neutral Suffix 14 allow the User to tailor a word list investigation according to these factors. For example, one can see by the phonetic spellings in the text area of FIG. 12 that some of the, -ate, ending words are stressed on the first syllable while others are stressed on the second syllable.

If the User decides she wants to concentrate attention on the words stressed on the second syllable, she clicks on the Cancel button 8 in the Page Up/Page Down dialog box 4. This action clears the words in the text area 3. The ending, *ate, remains in the Word test box 1 and the User types in the number, 2, in the Syllable text box 11 and then clicks the Input command button 5. The text area 3 is now loaded with 37,-ate, ending words stressed on the second syllable.

After looking at these last words, the User may want to know how many of these are prefixed words. To find out she again clicks the dialog cancel button 8. The text area 3 is cleared and the Control dialog box 4 is hidden. The Word and Syllable text boxes 1, 11 still contain their previous inputs and now the User types, P, in the Prefix box 12 and clicks the Input command button 5. Based on the three inputs the text area 3 displays 29 words that are prefixed words stressed on the second syllable out of the original 187 words ending in -ate.

If the User wants to know how many of the 29 words are verbs, she follows the previous steps and this time enters, v, in the Part of Speech box 13 and, after clicking the Input button 5, there are 26 prefixed verbs in the text area 3. If from the outset, the User knew she wanted to find all verbs in the "college" lexicon stressed on the second syllable and ending in, -ate, she could have loaded all appropriate text boxes and obtained the 26 words in a single step. It is anticipate, however, that many Users will use the analysis forms in an iterative manner.

While the above demonstration is a little artificial it illustrates the various controls the User has in analyzing the words in the two-syllable word database.

The following simple but important example illustrates the use of the Phone text box 2. First, the User clicks the dialog Cancel command button 8 that clears the text area 3. The User then clears the text boxes by selecting entries with the mouse and using the keyboard delete key.

With all text boxes cleared, the User types in the Phone text box 2 an asterisk followed by appropriate sound symbols representing the sound |shən|. The text box characters in the Concept Demonstrator look like the following: *¼ln, which is equivalent to: *shən. Special characters in the Concept Demonstrator are entered by pressing the Alt key and an appropriate four number code on the computer keyboard's numeric keypad. (An alternate embodiment for entering special sound characters is discussed later.)

Entering the Phone text box 2 input by clicking the Input command button 5 generates an output of all 45 words in the "college' lexicon that have the ending sound, |shən|. By comparing the word and phonetic spelling, the User can see the following letter endings correspond with the |shən| sound: -tion, -tian, -sion, -xion, -cean, -shan, and -chen. The |shən| sound corresponding to the first five letter patterns is the result of an important phonological process called palatalization.

If the User now types each letter ending in the Word text box 1 one at a time, he will be able to identify palatalization sound rules for the first four endings and learn some interesting phonetic features about the last three endings.

The principle use of the Phone text box 2 is to introduce initial or final word sound patterns in order to determine letter combinations that correspond to the sound. Then either unusual or frequent letter patterns can be entered to assess potential letter/sound guidelines or exceptions to guidelines.

The remaining text box 14 not yet addressed is the one labeled Stress Neutral Suffix. A stress neutral suffix is almost always added to a free root or "stand alone" word. As a result, the sound pattern for a two-syllable word is governed, in this case, by the sound pattern of a one-syllable word free root and the sound pattern of the suffix. Since these words follow a specific sound relationship it is best to separate these words from the database. A User can do this by typing, N, into the Stress Neutral Suffix box 14. This input removes 702 words from the 12321-word "college" lexicon.

To work with the 702 words with stress neutral suffixes, the User types in, S, in the text box 14 and enters one of 14 neutral suffix letter or sound patterns into either the Word or Phone text box 1 or 2. Examples of stress neutral suffixes are, -less, -ful, -man, -ship, as in helpless, careful, craftsman, friendship, respectively.

If the User types in a suffix letter ending, for example the ending, -less, in the Word text box 1 and types an, S, in the Stress Neutral Suffix box 14 and then clicks the Input button 5 she will get 139 words, each with the letter ending, -less, and sound ending, |lis|.

While the input controls provide the User with a good deal of flexibility to investigate various letter/sound relationships there are restrictions that prevent a complete analysis of two-syllable words. Some of the restrictions are discussed later in possible alternate embodiments for the Two-syllable Words Form.

In its present layout form, some of the input restrictions are partially overcome by providing the User with Selected Stored Queries available by User choice from a dropdown list in a Combo box 15. As an example one of the Selected Stored Queries implemented in the LearnWords Concept Demonstrator searches for all stress neutral suffix words in which the suffix is attached to a free root ending with a silent letter "e" as in the word, careful.

To get this list of words the User clicks the arrow 16 on the Combo box 15, which causes a dropdown list to deploy. The User then selects the desired Stored Query, in this case, 2. Neutral Suffix Words With Middle "e". The User's selection of this query results in an SQL statement that runs a Stored Query in the Database. The Recordset output for the Stored Query is 204 words, and phonetic spellings, that have a stress neutral suffix attached to a free root ending in a silent "e".

Like all other outputs to the text area 3, the outputs of the Stored Queries can be used as inputs to either the Select Words controls 9 or the "talking" dictionary controls 10.

To end his session with the Two-syllable Words form the User clicks the Return command button 17. This input closes the present form and opens the Start Form (FIG. 5).

Big Word Form

After returning to the Start Form, if the User wants to look at polysyllable words—words of three or more syllables—he clicks on the Open Big Word Form command button. This action closes the Start Form and opens the Big Word Form shown in FIG. 13. When this form first opens all input and output text areas are blank.

The phonetic emphasis for the Big Word Form shifts from letter/sound correspondences to word stress patterns. Although certain aspects of syllable stress are introduced in the two-syllable word forms, the Big Word Form is organized to highlight the effects of stress pattern on word pronunciation.

Almost all the words that are available on this form have a suffix. There are five types of suffixes featured on this form. Each suffix type correlate with a distinct word stress pattern. The five suffix types and their primary stress influence are given below:

| Type | Influence on Word Primary Stress |
| --- | --- |
| A | These are stress neutral suffixes and do not change the prime stress pattern of the free roots to which they are attached. |
| B | These suffixes are autostressed and cause the prime stress to fall on the suffix. Some of these suffixes, when attached to free roots, behave as Type A suffixes. |

-continued

| Type | Influence on Word Primary Stress |
|---|---|
| C | These suffixes cause prime stress to fall on the syllable immediately preceding the suffix. |
| D | These suffixes cause prime stress to fall on the second syllable back from the suffix. When some of these suffixes are attached to a free root they behave as Type A suffixes. |
| E | These suffixes have two possible prime stress patterns. The prime stress is on either the second syllable preceding or the syllable preceding the suffix depending on the charateristics of this syllable. Some of these suffixes, when attached to free roots, behave as Type A suffixes. |

One hundred words listed as a group under Type A, are words without prefixes or suffixes. This group is provided to demonstrate stress patterns for polysyllable simple words.

Figure 13:
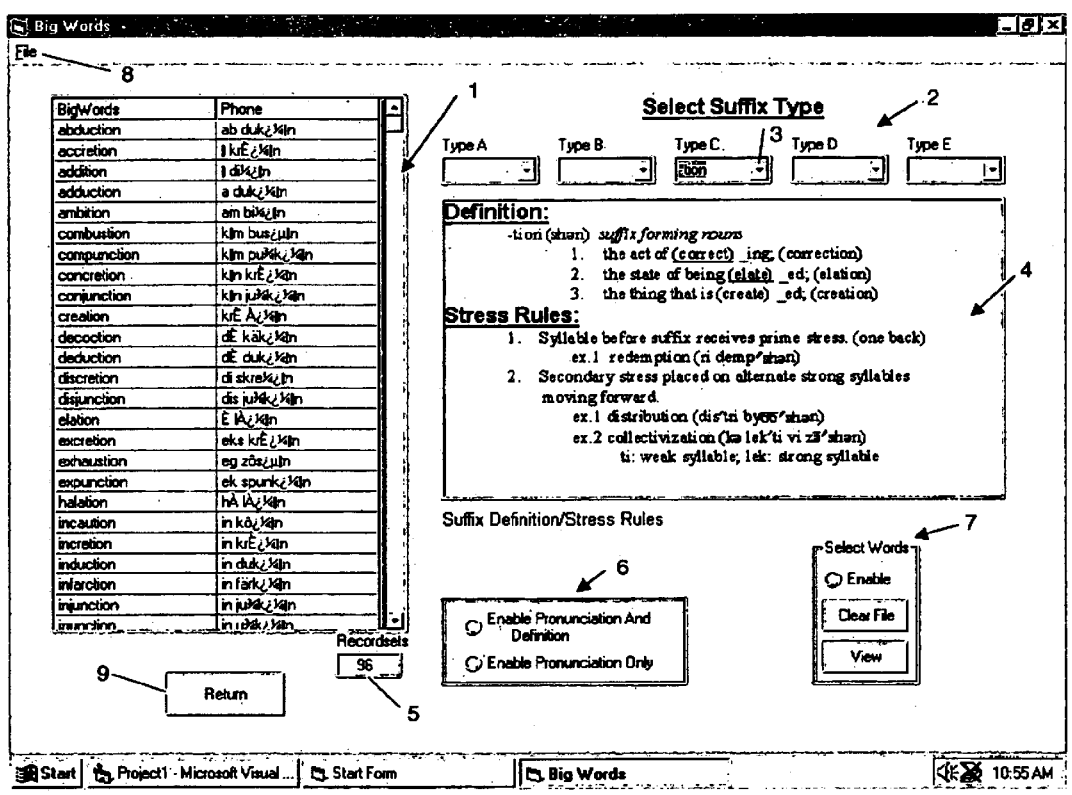
FIG. 13 is a screen view of the Big Word form after the User has selected a specific suffix as an input for polysyllable words.

Referring to FIG. 13 a User will obtain an output in the FlexGrid similar to the one shown whenever he selects a suffix from one of the five Combo Boxes 2 shown below the title Select Suffix Type. When the User clicks the arrow on one of the Combo Boxes 3 a dropdown list of suffixes is deployed. The suffixes in the list have stress patterns associated with the Type label on the Combo box.

When the User selects a suffix in the dropdown list by clicking on the suffix with the mouse pointer, this action results in the LearnWords SQL software creating a Select Query statement that is used to search the polysyllable word Database for the required words and phonetic spellings as outputs.

While the word lists are being loaded into the FlexGrid 1 shown in FIG. 13, the text area 4 is loaded from a separate file with Definition and Stress Rules appropriate for the selected suffix. The total number of words in the FlexGrid I is given in the text box 5 labeled Recordsets.

A field in the polysyllable Database contains information on each word's stress pattern based on use of the Word Structural Stress Method discussed earlier. The table below illustrates how the code for the stress field is generated for a variety of words:

| Word | Phonetic Spelling | Stress Code |
|---|---|---|
| reduction | ri duk'shən | bpb |
| amortization | am'ər ti zā'shən | bpbbs |
| stupefaction | stoō'pəfac'shən | bpbs |
| abbreviation | əbrē've  ā'shən | bpbsb |
| disapprobation | dis ap'rəbā'shən | bpbsb |

In the stress code the letters represent the following: p, primary syllable stress; s, secondary syllable stress; and b, no syllable stress(blank). The stress code is developed in reverse syllable order starting at the back of the word and moving forward. This field code is generated with a software program.

A sort of suffix words is made using the stress code field. This groups together words having the same stress pattern so that the User can identify common syllable features within these groups. Without going into detail the secondary stress placement depends on a syllable's phonetic content referred to as either a weak or strong syllable.

As is the case with other forms, the User can use the Pronunciation and Definition controls 6 to obtain "talking" dictionary aural and visual outputs in the same manner as explained with the Word Form. Also, the Select Words control 7 and the File Menu 8 print command operate in the same way as explained with the Word Form (FIG. 9).

When a User completes looking at the results for a selected suffix, she can click on the arrow 3 on any of the Type Combo Boxes 2 and select a new suffix. This action results in clearing the FlexGrid I and the text area 4 and loading a new list of words in the FlexGrid 1 and appropriate Definition and Stress Rules in the text area 4. While not all words in a group will follow the group's stress rule the User can scan the list and easily find the exceptions since the words are sorted by stress pattern.

Upon completing work with this form the User clicks the Return command button 9 and this input closes the form and opens the Start Form (FIG. 5).

Compound Form

The Compound Word Form is opened and the Start Form is closed when a User clicks the Open Compound Form command button located on the Start Form (FIG. 5).

Figure 14:
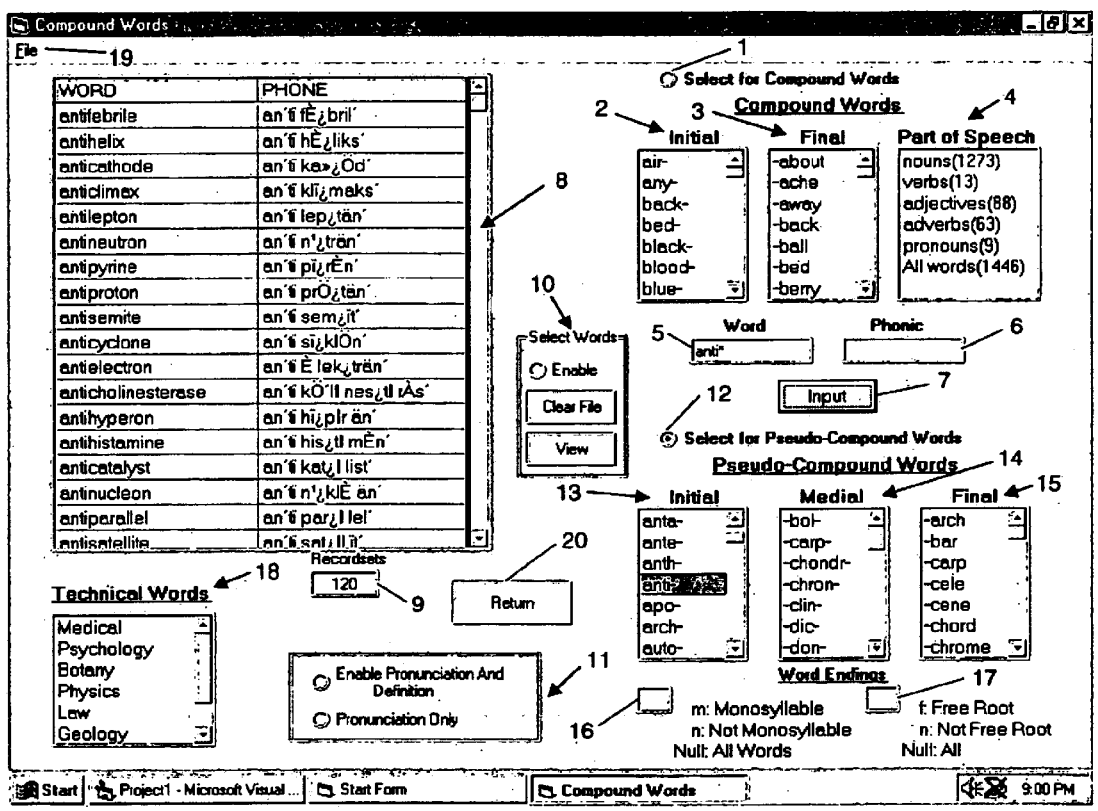
FIG. 14 is a screen view of the Compound Word form after the User has selected a pseudo-compound forming element as an input.

The Compound Words form is shown in FIG. 14. When this form is first opened the FlexGrid and the text boxes on the form are empty. The seven list boxes, however, are loaded with their respective lists.

This form is used to look at three types of words: Compound Words, Pseudo-Compound Words, and Technical Words. The approach used for compound words in the LearnWords Device is discussed first.

A compound word is composed of two or more juxtaposed words with the combination behaving as a single word with a meaning that may be distinct from the meanings of the component words. The component words may be joined together (fireplug), joined with a hyphen (knock-kneed), or simply placed together (covered wagon). Pronouncing compound words is not too difficult if one can pronounce the component words and adhere to the stress pattern associated with the combination.

The most difficult aspect of compound words for beginning readers or for foreign students learning English is recognizing joined compounds as made up of two separate words. As a consequence a list of commonly used, two-word, joined compound words are presented so that a teacher can create compound word recognition practice lists. The 1446 words in the joined compound word list are from an "elementary" level lexicon.

When the Compound Word Form is initially opened the default setting for the Select option buttons is on the button 1 labeled Select for Compound Words.

The User then can select a compound word list based on one of the following three options: (1) an initial word can be selected and all compounds in the lexicon with this initial word are listed, (2) a final word can be selected and all compounds in the lexicon with this final word are listed, or (3) compound lists can be selected as a function of the compound word's part of speech.

These three choices are presented in list boxes labeled Initial 2, Final 3, and Part of Speech 4, respectively. For Part of Speech 4 the number of words in each category is shown in parentheses. The number reflects the frequency of occurrence of the various compound word classes in an "elementary" lexicon. If one wants to view all the compound words in the database the All words entry under Part of Speech 4 is selected.

The following describes a typical operation for compound words. If the User selects with the click of the mouse the entry, blood-, contained in the Initial 2 list box, the word blood followed by the Wildcard asterisk appears in the Word text box 5. Now, when the User clicks the Input command button 7 an SQL Select Query statement is generated to find all compound words in the "elementary" lexicon that begin with the word, blood. The following six words— bloodhound, bloodshed, bloodshot, bloodstream, bloodsucker, and bloodthirsty—along with their phonetic spellings appear in the FlexGrid 8 and the Recordset text box 9 shows the number, 6.

Similarly, if the User now clicks, -bed, in the Final 3 list box the existing Word text box 5 entry, blood*, is replaced by the entry, *bed, where the Wildcard asterisk precedes the word. Upon clicking the Input command button 7, the User gets an output of five words—daybed, deathbed, hotbed, roadbed, and sickbed—and their phonetic spellings in the FlexGrid 8 and the number 5 shows in the Recordset text box 9.

To obtain a part of speech compound word list, the User clicks on one of the entries in the list box labeled Part of Speech 4. For example when the entry, adverbs(63), is clicked with the mouse and the Input command button 7 is clicked the FlexGrid 8 is filled with 63 adverb compound words, like anyway, downhill, halfway, etc., and the Recordset number box 9 shows, 63.

The lists of initial and final words do not contain all initial and final words in the 1446 compound word lexicon but only those words having four or more occurrences. To find words with less than four initial entries one can use the All words entry under Part of Speech 4.

The All words list is presented in alphabetical order so all initial words are grouped together. If there is an initial word listed with less than four entries the initial word does not appear in the Initial list box 2. For example, the initial word, arm-, appears in only the words armchair, armpit, and armrest so the initial word, arm-, is not included in the Initial list box's list 2.

A User can get a list of the three, arm-, compound words in the FlexGrid 8 by entering, arm*, in the Word text box 5 and then clicking the Input button 7.

A User can also input a sound pattern in the Phone text box 6 to search for compound words that have a common rhyme. For example, if the User wants to find some compound words that rhyme with the word, one, he enters, *un', in the Phone text box 6. Note that the symbol for secondary stress, ', must be included in this case. With this input the User gets the word list anyone, blowgun, everyone, grandson, homespun, shotgun, and someone in the FlexGrid 8 along with their phonetic spellings.

A teacher can use the Select Words control to construct word lists for students to use later or students can hear words pronounced by clicking them in the FlexGrid 8 after the "talking" dictionary control is activated. The Select Words 10 and "talking" dictionary 11 controls operate as described earlier in the Word Form (FIG. 9).

To obtain a list of Pseudo-Compound words the User clicks the option button 12 labeled Select for Pseudo-Compound Words. These words are not true compounds in the sense of consisting of joined free roots, however, they have many features common to compound words. The pseudo-compound word has an initial forming element attached to a free root or another forming element.

The forming elements are usually of Greek or Latin origin and the initial elements have their own stress patterns. Examples of initial elements are amphi-, ante-, counter-, inter-, etc. When a free root is attached to one of the initial forming elements the stress pattern for the free root remains unchanged and the initial element follows its own stress pattern.

If a non-free root and non-forming element is added to the initial element stress rules given for polysyllable words in the Big Word Form apply to the pseudo-compound word as a complete unit.

If a monosyllable forming element is attached to an initial element, either directly or by the use of a connecting vowel letter like, o, e, i, the final element has secondary stress and the compound word initial syllable takes primary stress in a two-syllable initial element. The second syllable of the initial element is unstressed.

The three list boxes under the heading labeled Pseudo-Compound Words provide the User with easy choice of word lists depending on Initial 13, Medial 14, or Final 15 elements. The Initial elements are frequently used prefixes or forming elements of Greek or Latin origin. The Final elements are frequently occurring monosyllable forming elements of Greek or Latin origin. The Medial elements are non-free roots to which initial elements are frequently attached.

A selection from one of these lists is exclusive. That is, if the User makes a selection from the Initial list box 13 and then makes a selection from the Final list box 15 the last selection overrides the first. When a selection is made from any of the three list boxes a corresponding entry is automatically loaded into the Word text box 5. For example, if the User clicks on the initial element, mega-, the following entry appears in the Word text box 5, mega*, where, *, is the Wildcard asterisk. If the User now clicks on the final element, -gam, the previous entry, mega*, is replaced by the entry, *gam.

After the User settles on an input from one of the three list boxes, say anti-, he clicks the Input command button 7 and a list of 120 words, and their phonetic spellings, are output to the FlexGrid 8 based on an SQL Select Query generated in software from the input, anti*.

If the User wants to see how many of the 120, anti-, words have a monosyllable ending and what is the stress pattern associated with this combination, he types the letter, m, in the text box 16 next to the label Monosyllable. Upon clicking the Input command button 7 the FlexGrid 8 is loaded with 16 words in which a monosyllable element is attached to the initial element, anti-.

The User can see from the phonetic spellings that all but two words, antitank and antitrust, have identical stress patterns with the first syllable having primary stress and the last syllable having secondary stress. If the User leaves the, m, in the Monosyllable text box 16 and clicks various Initial elements and clicks the Input button 7, he will see the stress pattern for this type of pseudo-compound is very regular. He will also be able to identify exceptions to the stress rule.

If the User again selects the element, anti-, and then enters the letter, n, in the text box 16 labeled Monosyllable and enters the letter, f, in the text box 17 labeled Free Root and clicks the Input button 7, the Flex Grid 8 is loaded with 72 words in which the initial element, anti-, is attached to free roots. A review of the phonetic spelling indicates the stress patterns, in most cases, are the same as if the free roots were stand alone words with the primary stress located in the free root. The initial element takes a secondary stress on the first syllable and no stress on the second syllable.

Again, the User can leave the Word Ending text boxes the same with an, n, in the Monosyllable text box 16 and an, f, in the Free Root test box 17 and then go one-by-one through the list of Initial elements, entering an element, clicking the Input button, and reviewing the output words in the FlexGrid 8. This assessment will show that when an initial element is attached to a free root, the stress pattern of the free root is unchanged in almost all cases. Again, the User will be able to identify exceptions to the stress rule.

Placing an, n, in both Word Ending text boxes 16, 17, will generate an output word list consisting of words in which the initial element is not attached to either a monosyllable or a free root. Example words for the input, anti-, are antibiotic, anticipation, antidromic, antilogy, antiphonary, etc. While not all of these words are pseudo-compound words, they almost all follow the same stress rules covered in the Big Word Form for polysyllable-suffixed words or polysyllable simple words.

The examples so far have had the User entering elements in the Word test box by clicking on elements in the three list boxes. The User can enter elements directly into the Word text box 5 or the element plus one or more following letters. For example, if the User wants to see all words in the database beginning with, hypoth-, he types, hypoth*, in the Word text box, clicks the Inputt button and obtains the following five words as output: hypothalamus, hypothecate, hypothemal, hypothetical, and hypothyroidism.

Similarly, the User can tailor the output word list by entering sound symbols in the Phone text box 6. If he wants to see all words with an initial element, hypo-, corresponding with the sound, hī'pə-, he enters, hypo*, in the text box and the appropriate sound pattern in the Phone text box 6 and the output is 35 words, like hypochondriac (hī☺pə k an'drē ak'), that have the same initial sound pattern. There are 58 total words in the database that have the initial element, hypo-.

The remaining list box 18 on the form labeled Technical Words is used to gain access to technical words used by the various academic fields shown in the list box. A large percentage of these words use word elements common to the pseudo-compound words.

If a student wants to make a quick study of the definitions and pronunciations of words in one of the various Technical word lists, he clicks on the desired field in the list box 18 and a corresponding word list is created through an SQL Select Query and loaded into the FlexGrid 8.

The student can now use the "talking' dictionary controls 11 to hear the various words pronounced and, if he desires, activate the definition option button and obtain a definition of the word.

If the student wants to select certain words for later reference, he can use the Select Words control 10 to make a tailored list and print the list for later reference by clicking the print command in the File Menu 19. As pointed out earlier, operations of the Select Words and "talking" dictionary controls are the same as outlined in the Word Form (FIG. 9).

When the User is through with the Compound Word form he clicks the Return command button 20 and this input closes the Compound Word form and Opens the Start Form (FIG. 5).

Special Form

Figure 15:
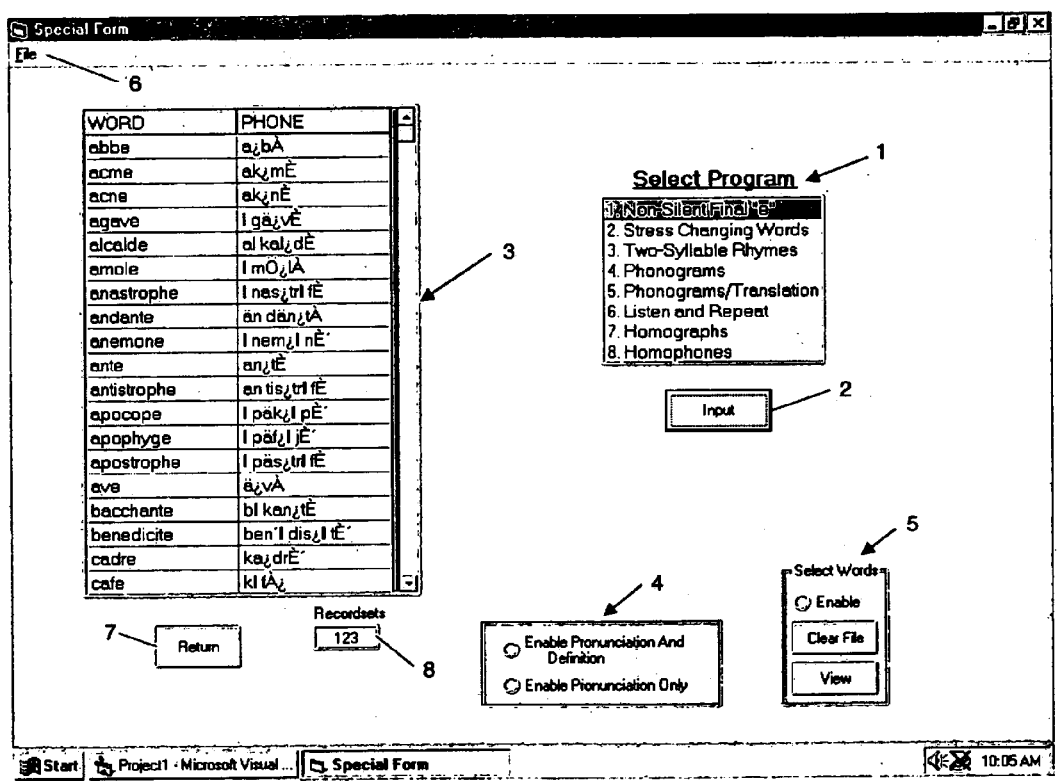
FIG. 15 is a screen view of the Special Form after the User has selected the Non-Silent Final "e" word list.

By clicking the command button on the Start Form labeled Open Special Form, the User activates closing the Start Form and opening the Special Form that is shown in FIG. 15.

When the Special Form is first opened the FlexGrid 3 is empty but the list box 1 labeled Select Program is filled with program choices for User selection.

The program options on this form provides the teacher or advanced students some important word lists that do not specifically fit one of the categories of words presented on the other forms.

A synopsis of the types of programs available on the Special Form follows:

Non-Silent Final "e": This program provides a comprehensive list of words from the "college" lexicon that end in a non-silent final "e".

Stress Changing Words: The English language has many words that can be used as different parts of speech. Sometimes this change in part of speech is indicated by a stress and sound change in the word. Examples are—convict (kăn'vĭkt)n. (kən vĭkt')v.; digest (dĭ'jest)n. (də jest')v.; project (proj'ekt)n. (prə jekt')v.—where, n., and, v., indicate the noun or verb part of speech, respectively. A comprehensive list is presented for this type of word.

Two-Syllable Rhymes: Having students listen to rhyming words is a good way to teach both new readers and foreign students of all ages studying English the sound patterns of the English language. This program extends the one-syllable rhymes given on the Phonic Form to two-syllable rhymes.

Phonograms: This program provides a list of one-syllable rhyme words organized to teach vowel sounds/syllable spellings in a systematic fashion.

Phonograms/Translation: The same word list as used above but with the English words accompanied with a foreign language translation. The program provides foreign language speakers training in both sound and meaning. Several different languages can be selectively downloaded from the LearnWords Device's setup ROM disc.

Listen and Repeat: The same Phonograms as above but with the added feature that when the "talking" dictionary is activated and the User clicks the word and listens to the pronunciation a voice follows asking the User to repeat the word.

Homographs: This program provides a list and meanings of small, common words that have alternate meanings. Examples are:
  mine This book is mine. (It belongs to me.) He dug a gold mine. (He dug a hole in the ground to find gold.)
  pen She writes with a pen. (A device for writing.) He put the pig in a pen. (The pen is an enclosed area.)

Homophones: This program provides a list of small, common words that have alternate spellings and meanings but have the same sounds. Examples are:
  knight means an ancient warrior.
  night means after the sun goes down.
  hall means a passageway.
  haul means to carry or move something.

When a User wants to look at one of the above word lists he clicks the program name in the Select Program list box 1, for example the Non-Silent Final "e" program, and then dicks the Input command button 2. This latter action generates an SQL statement in the SQL software that causes a corresponding Stored Query in the Database to run and generate the word list, and associated phonetic spellings, for output to the FlexGrid 3 as shown in FIG. 15. Also, the number of words in the list, 123, is shown in the text box 8 labeled Recordsets.

After the word list is available in the FlexGrid 3 the User can activate the "talking" dictionary control 4 to hear a pronunciation or see a definition of a selected word. This operation is the same as previously described with the Word Form (FIG. 9).

A teacher can use the Select Words control 5 to select and tailor a word list to coordinate with a daily lesson plan. Operation of the Select Words control is the same as previously described with the Word Form (FIG. 9). In the case of Homographs and Homophones word lists, only the selected words, but not the associated meanings, are stored for viewing. The User can obtain a hardcopy printout of both the words and meanings by using the File Menu 6 print option.

To terminate a session with the Special Form the User clicks the Return command button 7 and the Special Form is closed and the Start Form (FIG. 5) reappears. The User can now end his session with the LearnWords Device by clicking the Close command button 2 on the StartForm (FIG. 5). With this action the LearnWords Device is shut down.

A computer programmer of ordinary skill and a working knowledge of Microsoft® Visual Basic© and Microsoft® Access© can use the form displays (FIGS. 5 through 15) to construct a LearnWords Device modeled after the Concept Demonstrator. The Database construction based on Syllable Concept Method and Word Structural Stress Method is covered in the sections on Syllable Structure, Word Structure, and Big Word Form.

As mentioned in the text above all word outputs are generated in the Database by either Stored Queries or User generated Select Queries. Stored Queries are either Total or Select Queries using Database tables based on the Syllable Concept Method for one and two syllable words. Some Stored Queries activated by User selection from a list box or combo box, like the Technical Lexicon and Special Word Form, are simply SQL request for word lists as mentioned in the text.

User Input Select Queries all use the Like Function as previously mentioned except in those cases where a Null Function is required as is the case described for the One-Syllable Word analysis form. The SQL sort statement varies for the various word types as previously described.

ALTERNATE EMBODIMENTS

While the description of the operations of the Concept Demonstrator adequately portrays the underlying principles involved in the LearnWords Device, there are some features of the Concept Demonstrator that might be different in a final embodiment of the LearnWords Device. Some of the potential alternate embodiments are discussed below.

Phonetic Font

Microsoft's database system, Access©, and the Microsoft's display system, MSFlexGrid, both require that a single character font be used in a single entry cell. The User can change fonts from one cell to another but within a cell the User must stay with one font. A similar restriction applies with Microsoft® Visual Basic© calculating functions. These functions do not preserve font formatting.

If a single font contains all of the characters a User needs, the font restrictions mentioned above cause no major problems. On the other hand if characters are required from more than one font a scheme must be devised to overcome the restrictions.

In the Concept Demonstrator phonetic characters like -ā, ōō, ou, sh—are distributed in two different fonts. In order to overcome the font restrictions in Access©, Visual Basic©, and the FlexGrid the following procedure was used. All of the phonetic characters in one of the two fonts were redesignated as seldom used characters (or more properly, characters that would not be used) in the remaining font. For example, the single phonetic character, sh, was redesignated as the character, ¼, in the remaining font. If one looks at the phonetic spellings on the Big Words Form, FIG. 13, they will see the character, 14, takes the place of, sh, in the phonetic spelling of, -tion.

A software program can perform this redesignation of characters from one font to the other. Following the redesignation, all operations with Access©, Visual Basic©, and the FlexGrid can proceed without difficulty. The only problem occurs if the original phonetic characters are wanted in output devices such as the computer screen, printer, FlexGrid, etc.

The approach for outputs like the computer screen and printer, that can handle multiple fonts, is to redesignate fonts and characters in a software translation program, character by character, back to their original fonts and characters. The output displays in the text areas of the Two-Syllable Word Form, FIG. 12, and the View Form, FIG. 10, were generated in this fashion. However, since the cells in the FlexGrid can only take a single font, the phonetic outputs on this device has to display the substitute phonic characters used in Access© database manipulations.

There are at least two possible approaches to the font problem in a final embodiment. First, and probably the best solution, is to have a unique font designed that contains all the characters needed in the LearnWords Device. The second, is not to use the FlexGrid as an output device but instead use a software translation program and forms, picture boxes, printer, and other devices that can accommodate mixed-font formatted outputs.

Sound Inputs

In a desktop computer with a Windows operating system there are alternate ways of inserting special font characters that do not have a corresponding key on a conventional computer keyboard. All of the methods are somewhat cumbersome and more involved than simply striking a single key.

If there are only a few special characters one can setup shortcut keys to alleviate part of the insertion problem, but this approach is not too practical for the LearnWords Device due to the large number of phonic symbols involved. An alternative is to use the method of holding down the Alt key while entering a four-digit code on the Numeric Key Pad for each special character.

This latter method is used with the Concept Demonstrator by having a printed table that lists all of the phonetic special characters along with the four-digit code for the Numeric Key Pad. This approach is satisfactory but still a little cumbersome if there are many special characters to enter.

Two possible simpler approaches for special character input are: (1) a special auxiliary keyboard or (2) a simple keyboard code used in conjunction with a software translation program that converts keystrokes into appropriate special character code.

The mechanization of the special auxiliary keyboard should allow parallel inputs with a standard computer keyboard. The auxiliary keyboard must contain 13 keys to accommodate the phonetic special characters that cannot be obtained by use of the alphabetic keys on the standard keyboard. A software translation program is also needed to convert some standard keyboard inputs into special character inputs. For example, one can use the standard keyboard to type the letter combinations, sh, ch, or th, into a Phone text box but then these combinations must be converted into a single special character representing the sounds, |sh|, |ch|, and |th|.

The second approach, use of a keyboard code and a software translation program, does not require any auxiliary equipment. This approach relies on a rational assignment of keys to sound correspondences. The table below shows the sound/key relationships.

| Sound/Key Relationships | | | | | |
|---|---|---|---|---|---|
| Sound | Key | Sound | Key | Sound | Key |
| a | a | oi | oi | s | s |
| e | e | ou | ou | t | t |

-continued

Sound/Key Relationships

| Sound | Key | Sound | Key | Sound | Key |
|---|---|---|---|---|---|
| i | i | b | b | v | v |
| ā | o | d | d | w | w |
| ô | .o | f | f | y | y |
| u | u | g | g | z | z |
| o͞o | oo | h | h | sh | sh |
| ā | A | j | j | ch | ch |
| ē | E | k | k | zh | zh |
| ī | I | l | l | th | th |
| ō | O | m | m | th | .th |
| o͞o | U | n | n | n | ng |
| ŭ | .u | p | p | ' | ' |
| ə | @ | r | r | ' | " |

In general, the short vowel sounds correspond with lower case key of the particular vowel letter while long vowel sounds correspond with upper case key of the particular vowel letter. The short, |ô|, sound and the stressed, |ŭ|, sound are indicated by the letters, o, and, u, respectively proceeded by a period. The diphthongs, |oi|, and, |ou|, are represented by the letter pairs, oi, and, ou, respectively. The schwa sound, |ə|, is indicated by the symbol, @, located on the number 2 key.

For the most part consonant sounds correspond with consonant letter keys. The voiced, |thi|, sound is indicated by placing a period before the letter pair, th. The sound, |n|, is represented by the letter pair, ng. The primary stress mark, ', and secondary stress mark, ', are indicated by an apostrophe, ', and a quote mark, ", respectively.

The following table shows some examples of Phone entries versus the actual phonetic spellings.

| Word | Phone | Phonetic Spelling |
|---|---|---|
| create | krE At' | krē āt' |
| bimorph | bI'm.orf | bī'môrf |
| persecution | p.ur"si kyOO'sh@n | pûr'si kyo͞o'shən |
| primogeniture | prI"mO jen'i ch@r | prī'mō jen'i chər |
| injunction | in jungk'sh@n | in jugk'shən |

One can compare the input phonetic spelling to the actual phonetic spelling and assess how well a User might adjust to using the simplified keystroke inputs.

The only reason the regular keyboard can be used in this case, instead of the normal Alt key plus four-digit code, is that when the User types in a Phone text box a software program recognizes this input event as associated with a Phone input. From this point on a translation program can interpret the unique inputs in terms of required code for the database.

A feature can be added to assist the User in making a correct input. An option button can be placed beside the Phone text window and after the User types in the phonetic spelling, he activates the option button and the translation program replaces the User's text input with a translation of the text in the phonetic spelling of the output. For example, if the User enters the following in the Phone text box, *sh@n, where, *, is the Wildcard asterisk, and then activates the option button beside the Phone text box the text box entry will be changed to, *shən. The User can then check to see if he typed in the desired code before he clicks the Input command button to start a word search. If the code in the text box is not what he wants the User starts over again by selecting the code and pressing the computer's Delete key. The Phone text box is cleared and the User can try again.

Database Location

In the Concept Demonstrator the database program, Access 97©, resides in the desktop computer along with the LearnWords Device program.

If a school system or University has a centralized data processing center the database program can reside at the processing center as an alternate embodiment of the Learn-Words Device. In this manner Users can have access to data without having to have a resident database program in each User's computer.

By the same reasoning, the database program can be as remote as one wishes if the database is accessed via the Internet.

The LearnWords database is quite small relative to most databases that Access 97© can handle so that database size is not a factor in a decision to use a remote database.

Retaining the database in the User's computer has the advantage that the User can change and customize the database tables to suit the User's own specific needs. Also if the User is familiar with database programming she can do an extensive amount of personal word analysis using the database tables and the database's Query Design window.

Tools Menu

The Select Words and "talking" dictionary controls appear on most of the forms and are visible whether or not the User intends to use these tools. In an alternate embodiment these controls can be installed in a Tools Menu on the Menu Bar or in a Pop-Up Menu. Since the option buttons do indicate status there appears to be merit in keeping the controls visible on the form.

Talking Dictionary

As previously discussed the "talking" dictionary can be self-contained in the database program or a commercially available "talking" dictionary can be used.

Although a commercial "talking" dictionary has many more words than are in the LearnWords Device, about 5 to 10 percent of the time a word from the database is not in the "talking" dictionary. This problem is eliminated if the "talking" dictionary is located internally. Then every word in the database is assured of having both a pronunciation and definition entry.

On the other hand, if the User wants to customize some of the word tables he must now not only be concerned about loading the database with words and phonetic spellings but he also needs to add pronunciation and definition entries.

Because of the much larger pronunciation and definition database in a commercial "talking" dictionary the User can add words and phonetic spellings to the LearnWords Device and still have only about a 5 to 10 percent dropout rate. In fact, he can check his substitute word lists against the dictionary and then delete those words not contained in the "talking" dictionary or make other substitutions.

Alternately, an internal "talking" dictionary can have a much larger word base than the one that exists in the LearnWords Device in anticipation that existing database tables may be tailored and expanded.

Three different commercially available "talking" dictionaries were used in the Concept Demonstrator. The pronunciation and definition controls were originally designed to function with the American Heritage® Talking Dictionary™ using a SendKeys software approach that works well with this dictionary.

When the Random House Webster's Unabridged Dictionary© was substituted only the Pronunciation and Definition option could be used because there was no simple way to use a SendKeys command to activate the sound icon. In the Pronunciation and Definition option the dictionary is opened and remains this way until the User clicks outside the dictionary window. As a result the User can click on the sound icon to hear a word pronounced and then click outside the dictionary window to return to a word list and select another word. Hence, this dictionary can perform the same functions but just slightly slower and with an extra click of the mouse.

The third talking dictionary used, Webster's New World Five Language Talking Dictionary© doesn't require the prounciation and definition controls to provide an English prounciation of a word. The dictionary has a mode that the User can select that allows the User to obtain a pronunciation of any word he clicks with the mouse pointer.

With this option the User can click any word on a form and the dictionary pronounces the word. The word can be on a command button, in a FlexGrid, in a text area, and anywhere on the form and if it is clicked the dictionary pronounces the word. A disadvantage with this dictionary is that it does not supply a definition for words. It has a nice feature for English language learners in that if the mouse pointer is left on a word when it is clicked not only is a prounciation given but a pop-up dialog box translates the English into one of five foreign languages at the choice of the User.

Technical Lexicon

Study of the sound patterns of polysyllable words and pseudo-compound words provides a good word structure foundation for individuals specializing in various technical fields.

The databases associated with a specific technical lexicon can be extremely useful to newcomers in a specialty field. In today's environment, new technologies bring ever-changing words and terminology, computer and biological technologies are cases in point. Consequently, it is difficult to anticipate what disciplines and what terminologies should be included in the Technology Lexicons.

As a result the final embodiment of the LearnWords Device will provide sufficient flexibility that the Technical Lexicons can be changed and tailored to suit specific User needs. This requirement is closely tied to both the questions on where the database resides and the approach for implementing a "talking" dictionary.

Translations

One of the first difficulties a foreign student encounters in learning English is accustoming his ear to a sound system that, in most cases, is very different from his native language. English is unusual in having a large number of vowel sounds and having beginning and ending clusters of consonant sounds in words and syllables. Also, the rhythmic stress pattern of English in polysyllable words can be a challenge for many foreign students.

The LearnWords Device with the combination of word spellings, phonetic spellings, and sound can be a valuable learning tool for foreign students. In the Concept Demonstrator a Special Program is listed to give foreign students a translation of Phonograms to go along with the English words and sounds.

The final embodiment of the LearnWords Device may include a form specializing in learning features for foreign students including a broader use of translations to include vocabulary development as well as English sound pattern development.

Analysis Form

Accessibility of analysis tools and the logical subdivision of words are two major factors that impact the ease of analyzing words in a computer database. MICROSOFT® Access©, and other commercial databases, provide a variety of easy to use analysis tools. These analysis tools include functions that can count the number of letters in a word, can separate a letter or letter group from either end of a word, can recombine different portions of separated word parts, can compare and sort for common letter patterns in the list of words in the database, and so on. Almost any manipulation one might want to do on a word is possible although sometimes the coding to accomplish an analysis task can be complex and difficult if one is constrained to work with a complete, large word.

Logical divisions of a word into parts alleviate the analysis-coding problem. A logical word division hierarchy is—Word, Syllable, Syllable Parts (Onset, Peak, Coda), and Letters. Analysis manipulation code becomes simpler as one moves down this hierarchy but, unfortunately, the number of fields for which code must be written or selected, becomes greater forcing a trade-off decision.

In the Concept Demonstrator the database manipulation for one and two syllable words is accomplished at the Syllable Parts level. This same word division is used in the One-Syllable Words analysis form shown in FIG. 11. As one can see in the FIG. 11 this word division for analysis requires User access to six text boxes—three for the Word and three for the Phone.

If this same approach is used for a two-syllable word the User must have access to 12 text boxes, each syllable requiring three Word and three Phone text boxes. In addition other factors like stress, affixation, and part of speech come into play for two-syllable words.

As a result of the increase in inputs a compromise was made in the Concept Demonstrator to limit analysis capability of two-syllable words and provide the User only two text boxes, one for the Word and one for the Phone, as seen in FIG. 12 on the Two-Syllable Words form.

In a final embodiment of the LearnWords Device an alternate approach to increase two-syllable word analysis capability is to provide User input at the syllable level. The User then has two text boxes for the Word pseudo-syllables and two text boxes for the Phone syllables. The four text boxes for other word factors presently on the form would be retained.

The complexity of a selected User analysis option must be balanced with the fact that a User experienced with Access, or other database programs, can use the power of the database directly since the Word and Phone tables are stored in the database. By working in the database system directly the User will gain in word analysis but lose the output and instructional capabilities of the LearnWords Device.

The purpose of the two-syllable analysis form is to give the average or typical teacher some added analysis capability in a relatively simple operational manner. Various word groups with common affixation or beginning and ending sound patterns can be simply and rapidly pulled from the database for instructional use Alternate Embodiment Summary Any of the alternate embodiments discussed above can be used in the LearnWords Device in fulfillment of the invention's intent to provide an instructional device on the sound patterns of English that a teacher can use for personal enlightenment and also use as an instructional tool for their students.

The design focus of the LearnWords Device is to provide flexibility in output so teachers can tailor word lists to suit their own lesson plans. As a result, in the final embodiment the types, layouts, and number of forms may differ from those shown for the Concept Demonstrator.

I claim:

1. A method of selecting words and phonetic data for self-directed study of the sound patterns associated with words by an individual with some knowledge of the subject, comprising the steps of:
    (1) displaying on a computer monitor a visual display, called a Form, with a plurality of visual input devices correlated with a plurality of word groups;
    (2) selecting a word group;
    (3) selecting output of either (1) count data types on words and phonetic parameters correlated with a plurality of syllable types or (2) word lists and associated phonetic data from a plurality of word types;
    (4) providing inputs to guide and constrain the search for count data types and word and phonetic data;
    (5) providing an input to constrain count and word list output data corresponding with word grade skill levels;
    (6) displaying a plurality of either count data types or word types and phonetic data based on the selections and inputs of steps (2) through (5):
    (7) creating files of selected word lists and phonetic spellings for immediate viewing or archive storage for later viewing;
    (8) creating a command input to obtain pronunciation and/or pronunciation and definition of a selected displayed word;
    (9) selecting displayed word lists and phonetic data to make printed outputs;
    (10) reviewing the displayed data on the computer monitor and iteratively altering selections and inputs of steps (2) through (5) to gain further insight on word sound patterns;
    (11) responding with revised display data based on inputs of step (10); and
    (12) selecting a navigation input to move to another word group or to close the display if the learning session is complete.

2. A method according to claim 1, wherein the plurality of word groups are contained in database tables that store words, phonetic spellings, syllables, word structural data, part of speech and word structural stress code for the following word groups—total word lexicon, one syllable words, two syllable words, three or more syllable words, simple compound words, pseudocompound words, technical words, and special words—with the total lexicon database table containing words and phonetic spellings that appear in university level dictionaries and the words and phonetic spellings in all the other said word groups are extracted from the total database table.

3. A method according to claim 1, wherein the grade skill level words are contained in three database tables correlated with words that a student may be exposed to by the third grade, eigth grade, and twelfth grade, respectively.

4. A method according to claim 1, wherein the selection of a word group provides access to a plurality of visual displays, called Forms, that contain a plurality of displayed input and output devices configured based on data type selection.

5. A method according to claim 1, wherein the selection of count data type provides a visual display Form configured with a plurality of input and output devices for selecting phonetic data obtained by a summation over the totality of a selected word group database and visually displaying the results.

6. A method according to claim 1, wherein the selection of word lists and associated phonetic data provides a visual display Form configured with a purality of input and output devices for selecting word lists, phonetic spellings and associated phonetic data of a selected word group database by the use of search restricting input criteria and visually displaying the results.

7. Apparatus for selecting words and phonetic data for self-directed study of the sound patterns associated with words, comprising:
    means for selecting a word group;
    means for generating display Forms containing input and output devices;
    means for sequencing from one display Form to another based on user activated inputs;
    means for entering user Generated textual and nontextual inputs as guiding and limiting criteria for data search for both count and word list data and for search for letter and sound correspondences at the syllable level;
    means for facilitating the search for word lists, phonetic spellings and phonetic data;
    means for facilitating the search for letter and sound correspondences at the syllable level;
    means for restricting or correlating search for count and word list data with grade word skill level;
    means for displaying count data, word lists and phonetic data resulting from data searches;
    means for carrying out iterative searches for sound and letter patterns;
    means for selecting count data to search for and display the list of words and phonetic data associated with the selected count data;
    means for selecting a displayed word from a word list and generating a command to activate a "talking" dictionary and have either the word pronounced or have the word pronounced while a definition is displayed;
    means for selecting a plurality of words that illustrate specific sound patterns and storing the words and phonetic spellings in a file for either immediate viewing or later display;
    means for displaying word lists and phonetic spellings contained in stored files; and
    means for selecting count data or word lists and phonetic data for creating printed copies.

8. Apparatus according to claim 7, wherein user generated textual inputs, consisting of alphabetic letters for words, phonetic characters for phonetic spellings, and industry standard Structured Query Language "wildcard" search parameters combined to form search commands, provide means for facilitating the search for word lists, phonetic spellings and phonetic data.

9. Apparatus according to claim 7, wherein pseudosyllable and syllable parts of Onsets, Peaks, and Codas, for the word and the word phonetic spelling, contained in the one and two syllable word databases, provide means for facilitating the search for letter and sound correspondences at the syllable level for one and two syllable words.

10. Apparatus according to claim 7, wherein a stress code, based on the syllable stress pattern in a word's phonetic spelling and contained in the databases of words of three or more syllables, provides a means to sort and group output word lists by word stress patterns and to provide a means for facilitating the search for letter and sound correspondences at the syllable level for words of three or more syllables.

11. Apparatus for selecting words and phonetic data for self-directed study of the sound patterns associated with words, comprising:

a memory that holds word database tables, a database search engine program, a "talking" dictionary program, and selected word list and phonetic spelling files;

a display device on which Forms containing input and output devices and outputs of count, word and phonetic data are displayed;

a keyboard device that interacts with the display device and permits a user to enter textual inputs for word, phonetic spellings, and phonetic data;

a pointing device that interacts with the display device and allows a user to:
 (1) enter search criteria to define and limit data searches,
 (2) select preprogammed inputs for count data searches,
 (3) select a specific count data item to generate word lists and phonetic spellings associated with the specific count data,
 (4) select a displayed word, from a word list, to generate a command for word pronunciation or pronunciation and definition, and
 (5) select specific displayed words, from one or more word lists, to generate files illustrating sound patterns for viewing on the display device;

a speaker system to provide aural output based on an input from a "talking" dictionary;

a processor that accepts inputs from the various input devices and generates Structured Query Language statements used to activate the database search engine program to find the requested count, word, and phonetic data located in the database tables and formats the data for viewing on the display device and, when requested by an input, supplies a pronunciation command to a 'talking' dictionary.

* * * * *